United States Patent [19]

Pippel et al.

[11] Patent Number: 4,750,965

[45] Date of Patent: Jun. 14, 1988

[54] ADAPTIVE CONTROL FOR TAPE LAYING HEAD HAVING NATURAL PATH GENERATION

[75] Inventors: James J. Pippel; Bernd A. K. Messner, both of Rockford, Ill.

[73] Assignee: The Ingersoll Milling Machine Company, Rockford, Ill.

[21] Appl. No.: 845,858

[22] Filed: Mar. 28, 1986

[51] Int. Cl.[4] .................................. B32B 31/00
[52] U.S. Cl. ...................... 156/361; 156/523; 156/574; 156/577; 364/150; 364/474
[58] Field of Search ............... 156/361, 574, 577, 523; 364/150, 474

[56] References Cited

U.S. PATENT DOCUMENTS

| | | | |
|---|---|---|---|
| Re. 30,016 | 5/1979 | Hohn | 364/474 |
| 3,560,308 | 2/1971 | Buck | 156/522 |
| 3,574,040 | 4/1971 | Chitwood et al. | 156/350 X |
| 3,577,297 | 5/1971 | Howard | 156/522 |
| 3,577,303 | 5/1971 | Buck | 156/522 |
| 3,607,572 | 9/1971 | Jorgensen | 156/505 |
| 3,625,799 | 12/1971 | Way | 156/530 |
| 3,752,728 | 8/1973 | Smirnov et al. | 156/577 |
| 3,775,060 | 11/1973 | Courtois et al. | 23/253 R |
| 3,775,219 | 11/1973 | Karlson et al. | 156/363 |
| 3,810,805 | 5/1974 | Goldsworthy et al. | 156/361 |
| 3,939,034 | 2/1976 | Tanaka et al. | 156/522 |
| 3,970,831 | 7/1976 | Hegyi | 156/363 X |
| 3,992,244 | 11/1976 | Craig et al. | 156/521 |
| 3,997,387 | 12/1976 | Yamaguchi et al. | 156/519 |
| 4,011,437 | 3/1977 | Hohn | 235/151.11 |
| 4,133,711 | 1/1979 | August et al. | 156/353 |
| 4,180,181 | 12/1979 | Brandwein | 221/70 |
| 4,182,645 | 1/1980 | Hill | 156/361 |
| 4,208,238 | 6/1980 | August et al. | 156/523 |
| 4,259,144 | 3/1981 | Ballentine | 156/523 |
| 4,285,752 | 8/1981 | Higgins | 156/522 X |
| 4,292,108 | 9/1981 | Weiss et al. | 156/361 |
| 4,328,061 | 4/1982 | Off et al. | 156/353 |
| 4,328,062 | 5/1982 | Off et al. | 156/361 X |
| 4,330,357 | 5/1982 | Collins | 156/584 |
| 4,338,659 | 7/1982 | Kurakake | 364/150 |
| 4,351,688 | 9/1982 | Weiss et al. | 156/523 |
| 4,370,721 | 1/1983 | Berenberg et al. | 364/474 |
| 4,382,836 | 5/1983 | Frank | 156/522 X |
| 4,419,170 | 12/1983 | Blad | 156/361 X |
| 4,453,221 | 6/1984 | Davis et al. | 364/474 |
| 4,491,906 | 1/1985 | Kishi et al. | 364/300 |
| 4,506,335 | 3/1985 | Magnuson | 364/174 |
| 4,516,461 | 5/1985 | Schaeffer | 83/563 X |
| 4,531,998 | 7/1985 | Peterson | 156/574 |
| 4,557,783 | 12/1985 | Grone et al. | 156/523 X |
| 4,557,790 | 12/1985 | Wisbey | 156/511 |
| 4,569,716 | 2/1986 | Pugh | 156/510 |
| 4,591,402 | 5/1986 | Evans et al. | 156/574 |
| 4,598,380 | 7/1986 | Holmes et al. | 364/513 |
| 4,601,775 | 7/1986 | Grone | 156/523 |
| 4,627,886 | 12/1986 | Grone et al. | 156/574 |
| 4,634,946 | 1/1987 | Moulds et al. | 364/150 |
| 4,663,703 | 5/1987 | Axelby et al. | 364/150 |

FOREIGN PATENT DOCUMENTS 2083658 3/1982 United Kingdom ............... 364/474

OTHER PUBLICATIONS

"Natural Path Report", 2-52700/4AVO-167 (covered by letter of 15 Oct., 1984).

"ATLM Post-Processor Requirements" Report, 2-52700/4AVO-196 (covered by letter of 13 Nov., 1984).

Primary Examiner—Jerome Massie
Attorney, Agent, or Firm—Fitch, Even, Tabin & Flannery

[57] ABSTRACT

A tape laying machine for depositing composite tape on the surface of a mandrel having a tape laying head positionable in multiple axes by a linear interpolative feedback control in combination with an adaptive control. The feedback control receives a commanded position from a natural path part program and regulates motion of the tape laying head of the machine along a track which will not unequally tension the edges of the tape and which is highly reproducible. The adaptive control separately varies the motion produced along individual axes by the feedback control without changing the tracking path to ensure correct tape laying conditions.

15 Claims, 15 Drawing Sheets

ADAPTIVE CONTROL FOR TAPE LAYING HEAD HAVING NATURAL PATH GENERATION

This invention relates to an adjunct adaptive or reactive control of a tape laying head which is preprogrammed for the deposition of composite tape along its natural path upon a surface of compound curvature.

BACKGROUND OF THE INVENTION

In the context of this invention, the term "composite" describes a material consisting essentially of high strength fibers or filaments of graphite, or other material, embedded in a matrix of a thermosetting resin which serves when cured to maintain the alignment of the fibers and their relationship to one another within the matrix as the material is stressed. As applied to the construction of aerodynamic surfaces, composite material has heretofore taken the form of woven mats preimpregnated with resin and, more recently, resin tapes embedded with fibers or filaments aligned in the longitudinal direction of the tape, multiple courses of which are laid side by side to construct one ply or layer of a manufactured article which is then constructed incrementally of successive layers of tape.

The application of these construction techniques to contoured surfaces heretofore has been essentially one of first laying up the laminated structure on a flat surface and then transferring or pressing the layup into a mold having the final contour of the part to be fabricated so that the layup will assume the desired shape. The mold with the composite layup applied thereto is then autoclaved. The layers of resinous matrix material merge into a unitary structure during the initial stages of the process and then solidify upon continued exposure to the high temperature in the autoclave as the resin cures.

The described system poses a number of problems in the molding of surfaces of compound curvature i.e., those curved in multiple planes or on multiple axes. One problem is conforming a plane table layup to the compound surface of a mold and this problem becomes more prominent with the severity of the curvature encountered. In all cases, irrespective of curvature, the mere necessity of transferring the layup from a flat lay surface to a mold and pressing it into conformity with the mold surface is a labor-intensive and time-consuming operation.

It is accordingly desirable from the standpoint of manufacturing efficiency and the integrity of the final product to form the laminated layup with composite tape laid directly upon the compound surface of an appropriately shaped tool or mandrel. This is preferably done with composite tape to make the most efficient use of the strength of the fibrous material, as well as to conform the essentially planar form of the building material more readily to the compound curvature of the mandrel. Such conformance is much more easily accomplished with composite tape than by the use of broad goods.

Even with composite tape, however, the practical necessity of working with tapes of finite widths in the range of from 1 to 6 inches and thicknesses of about 0.0055 to 0.010 inches, and the essential inelasticity of the fiber core of the tape under laying conditions, create their own problems. The primary difficulty is conforming the composite tape to the compound surface without puckering one edge or the other of the tape as the tape laying mechanism follows, within limits, the curvature of the lay surface on any selected tape course.

To overcome this problem, it has been proposed, as disclosed in U.S. Pat. No. 4,696,707, entitled "COMPOSITE TAPE PLACEMENT APPARATUS WITH NATURAL PATH GENERATION MEANS" and issued to Lewis et al., which is commonly assigned with this invention, that any given lay surface first be defined mathematically with respect to the tape laying machine coordinate system, and that the tape be applied to such a surface by following a preprogrammed natural path of the tape thereon while conforming as nearly as possible to the direction in which the designer would prefer to have the fibers aligned for the sake of the strength of the part. By the technique disclosed in Lewis et al., the path of each successive course within a ply, and each successive ply in the layup of the laminated article, is predetermined such that the machine is programmed to lay the tape without tensioning the tape edges unequally. This avoids the puckering of the tape along either of its edges as would inevitably happen if the laying mechanism sought to steer the tape forcibly to any substantial degree away from its natural path.

To rapidly and accurately generate a natural tape path for a part program, the programmed machine of Lewis et al. uses a mathematical description of the lay surface on the workpiece area of a mandrel forming the complex contoured shape. This mathematical description of the lay surface describes the shape and contours of the mandrel in terms of various Z-axis heights or offsets from a control plane broken into convenient X-Y areas. Because it is the tape laying head of the machine which is to be moved, the X-Y areas of the control plane are referenced not to the actual coordinates in space of the surface of the mandrel but to the internal coordinate system of the tape laying machine. Therefore, there is at least one area of concern in laying tape precisely on the mandrel which must be addressed to enhance the rapid manufacture of parts in this manner.

The problem which must be overcome for the precision production of layered parts is that the mandrel may not exactly conform to the mathematical description used to generate the natural path part program. There are many reasons for a discrepancy between the actual surface and the mathematical description thereof. Some of the most prevalent reasons include an approximation of the surface in the first instance, the inability to manufacture two mandrel surfaces exactly the same, and changes in the mandrel surface due to tape laying environment such as wear, warpage, etc.

When making the mathematical description of a mandrel surface in the first instance, the description of the actual surface must be an approximation to some degree. The more surface points that the description uses the better the approximation will be, but it is still an approximation. Moreover, if one uses less points, some sacrifice in accuracy will be seen but at the gain of production rates as less surface points have to be accounted for by tape head movement. Because of the size and complexity of the mandrels used in the production process, no two can have exactly the same surface. An ideal or designed mandrel surface, a standard, is used to make the mathematical description by digitization or the like. The amount by which other actual mandrels differ from this standard will cause errors in the tape laying process. However, this process allows mandrels to be interchangeable from part to part and from production facility to production facility.

Moreover, each mandrel surface will change in the ordinary course of production over time because of different environmental conditions such as expansion or contraction, wear, and warpage. Additionally, when making a part of many layers, the mathematical description assumes that each ply is a constant thickness and changes the description accordingly. The composite tape on an average is a nominal thickness but each ply is different and changes the actual surface from the original representation by a small amount. Although each actual change may be extremely small, some changes tend to accumulate and with the use of the same part program for different mandrels, there may be changes that occur in different directions which exacerbate an attempt for remedy.

Adaptive control has been suggested as a solution to the problem of deviations of the actual surface from the representative surface. Previous attempts to lay composite tape on a complex contour by seeking to control the lay path direction completely by adaptive sensing of the tool surface have encountered significant problems.

One problem with prior adaptive approaches has been the selecting of control gains and authority levels for the control. If the control is made sensitive enough to respond to slight variations in surface imperfection, then, at the velocities and gains needed for this precision, the control becomes oscillatory and unstable and will not settle readily into a smooth motion such that composite tape can be correctly laid. Alternatively, if the gain and authority of the control is reduced significantly, then the lack of precision that the tape layer displays in following a correct path fails to produce the desired quality in the parts. The only ready answer to this problem is to slow the machine to production rates which are unacceptable, i.e., to trade off productivity for control.

Further, for multi-axis tape laying machines simultaneous adaptive control of all axes has not been advantageous. The coupling of all the adaptive inputs into one control algorithm has proven unworkable because the interaction between separate axes is not readily definable. Without a precise definition of the complex coupling mechanisms between movements, an integrated adaptive control cannot achieve the precision necessary for tape laying machines.

Another problem which is inherent in the previous adaptive approaches and which cannot be readily solved is the basic nonreproducibility of the parts. Because prior adaptive controls continue to hunt along a tape course path and do so in an unpredictable manner, every part made by this method, even on the same tool surface, will be different from any other part. Therefore, quality control and reproducibility of precision parts has not been obtainable by adaptive methods.

The natural path control set forth in Lewis et al. solves the quality control problem by precisely and reproducibly generating a programmed path for a composite tape laying head which will produce complex contoured parts with facility. Because it is desirable to retain the exact tracking path from part to part, deviations of the actual surface from the mathematical description which is used to calculate the natural path are not compensated by the part program.

It is now known that differences between the mathematical representation of the mandrel surface and the actual surface tend to cause more problems in the area of the quality of the tape lay, i.e., whether the tape course is properly adhered to the underlying surface, than in course path tracking. Therefore, adaptive controls which do not affect the tracking path but affect only the tape laying conditions can provide gains in the quality of the tape laying. The correct laying conditions for composite tape are a substantially constant pressure on the tape with the pressure being applied by a roller surface substantially flat against the contour of the tool surface, and with the tape directly under the roller surface. An adaptive control system which can correct for actual variations in the tool surface without changing the natural tracking path of the machine would be advantageous because the reproducibility and speed of the natural path control would be retained while insuring that the composite tape was laid under the optimum conditions.

The adaptive control system of the present invention is adapted to be superimposed upon a preprogrammed natural path for a tape laying head for the sake of dealing with discrepancies between the part program and the actual lay surface as it is encountered by the tape laying head in action. Such discrepancies, depending upon their nature, may call for independent local or transient adaptive adjustments of the tape laying head on one or more of its axes of movement without deviating from the natural tracking path.

SUMMARY OF THE INVENTION

The invention provides an adaptive control to modify the preprogrammed natural path movement of a multi-axis tape laying machine employed in the manufacture of composite articles of compound curvature. The adaptive control compensates only for the variations in tape laying conditions caused by the actual surface of the tool being different from the mathematical representation used for generating the natural path. In the preferred arrangement, the adaptive control independently modifies several of the tape head movements along the preprogrammed path without changing the tracking path.

In general, the tape laying head of a machine is moved in three linear dimensions X, Y, and Z and two rotational dimensions A and C with a control according to a preprogrammed natural path part program. A segmented laydown roller is provided to maintain a substantially constant pressure on the composite tape as it is laid so that it will adhere properly to an underlying surface. The control of the roller assembly requires that the rollers are maintained in contact with the surface, are parallel to the surface contour, and squarely track the lay of the composite tape. Adaptive control means are provided to generate signals which are superimposed on the control signals of the natural path tracking so that these tape laying criteria are met.

The adaptive control includes means for sensing any sideward deviation of the composite tape from its normal path centered beneath the plurality of laydown roller segments which would indicate that the machine is being steered in a direction other than that which the tape seeks to follow. The sensing of such deviation calls for the turning of the tape head on its vertical or C-axis to align the head with the axis of the natural tape path.

The adaptive control further contemplates the sensing of any differential deflection of segments of the laydown roller to detect any divergence of the horizontal tilt of the tape laying head from that normal to the lay surface in making a "side hill" or "cross contour"

lay. The signals generated by such sensors are used to adjust the rotation of the tape head on a horizontal, or A-axis, to balance the deflection of the outermost segments of the laydown roller so as to maintain the roller surface parallel to the mandrel surface.

Similarly, in addition to restoring a balanced deflection across the segments of the laydown roller by tilting the tape laying head on its A-axis, the deflection of a central segment of the laydown roller is employed by the adaptive control to raise or lower the entire tape laying head via a vertical or Z-axis movement to maintain contact with the mandrel surface. This adaptive control keeps the roller surface and center point of that surface from leaving the centerline of the ram on which the tape head is carried and the centerline of the "A" axis pivot.

The adaptive control modifies the natural path control to compensate for differences between the actual mandrel surface and the representative surface which affect the quality of the tape laying. The conditions of the tape laying are corrected by the adaptive control without disturbing the rapid and tightly controlled movements of the tape laying head along the natural path track. Therefore, the system provides reproducibility for each part without any sacrifice in the quality of the tape lay.

BRIEF DESCRIPTION OF THE DRAWINGS

The foregoing and other objects of the invention are accomplished by the mechanism described and explained in detail in the following specification which should be read in conjunction with the accompanying drawings wherein.

DETAILED DESCRIPTION OF THE PREFERRED EMBODIMENT

General Orientation

Figure 1:
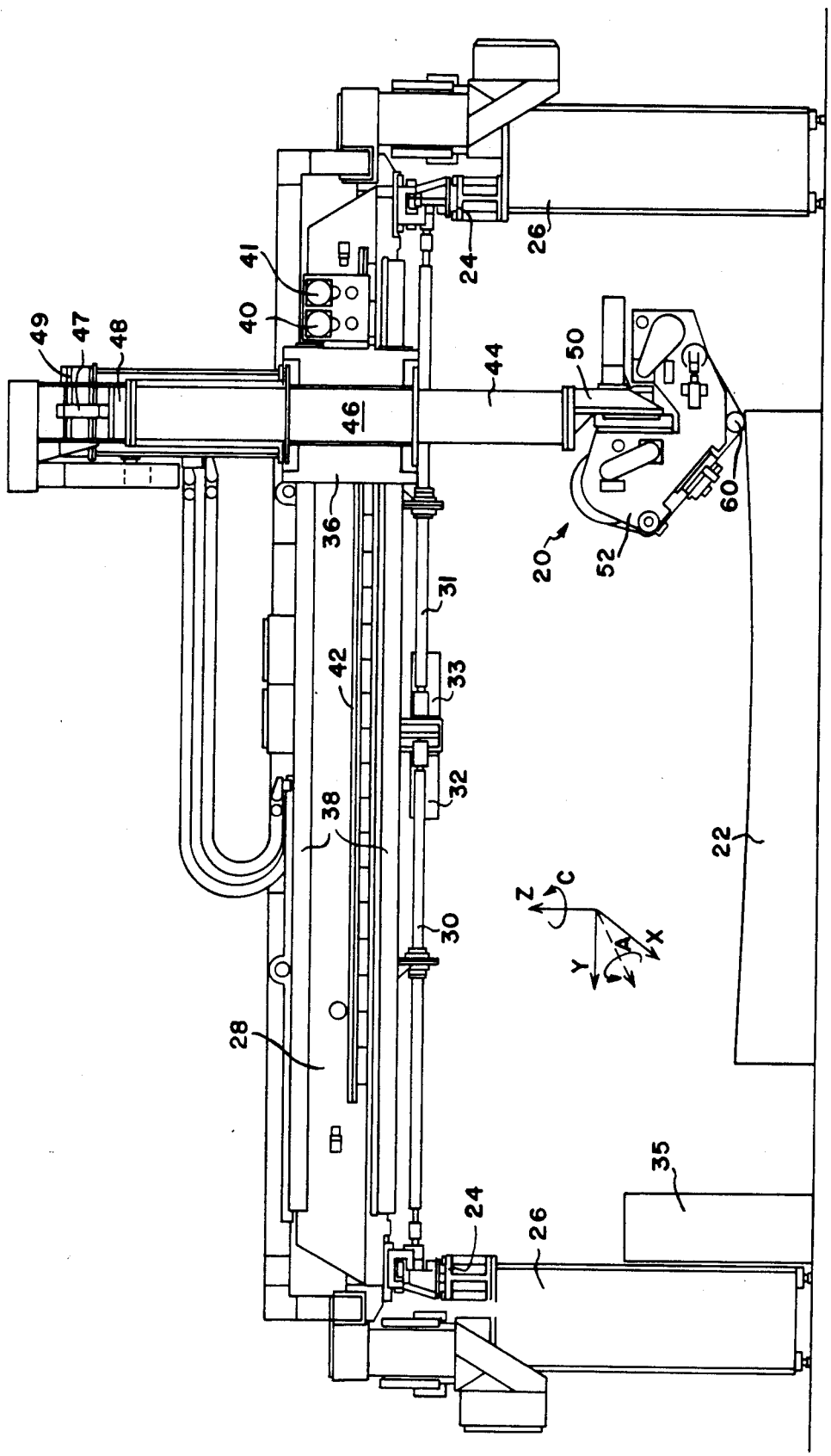
FIG. 1 is an elevational view of a multi-axis tape laying machine having a gantry mounted tape laying head for applying composite tape to a curved mandrel surface.

The tape laying head 20 of a composite tape laying machine to which the invention is applied is illustrated in FIG. 1. The tape laying head 20 is shown suspended from a gantry mounting, poised for laying a course of tape from right to left upon the curved, upwardly-facing surface of a mandrel 22. The mounting arrangement of the tape head 20 provides five axes of movement, three linear in axes X, Y, and Z, and two rotational in axes A and C. A-axis motion is rotational about a horizontal line parallel to the X-Y plane through the center of the tape laying head 20 while C-axis motion is rotational about the Z-axis.

The gantry mounting comprises a pair of spaced parallel rails 24 each elevated upon any suitable trestles 26 or other supports and spanned by a cross rail carriage 28 which is driven along the parallel rails in a direction perpendicular to the plane of FIG. 1 to provide what is termed the X-axis movement of the tape head 20. The X-axis drive is a gear and rack (not shown), the pinions of which are mounted at the ends of cross shafts 30 and 31 suspended from the cross rail carriage 28 and driven without backlash by a pair of opposing servo motors 32 and 33 mounted on the underside of the cross rail carriage midway of its span. Feedback position sensors (not shown) such as angular resolvers are provided with respect to servo motors 32, 33 to generate signals indicative of the actual position of the tape laying head along the X-axis.

Lateral or Y-axis movement of the tape head 20 is provided by a movable saddle 36 mounted on ways 38 on the facing side of the cross rail as seen in FIG. 1. The saddle 36 is driven along ways 38 by a pair of opposed servo motors 40 and 41, each driving pinions (not shown) engaged without backlash with the opposite tooth flanks of an elongated rack 42 extending along most of the span of the cross rail 28 and atop the lower one of the ways 38. Angular resolvers or other feedback sensors are associated with servo motors 40, 41, to generate signals indicative of the actual position of the tape laying head along the Y-axis.

The tape head 20 is secured to the lower end of a torque tube 44. The torque tube 44 and a ram 46 are vertically slidable in the saddle 36, the torque tube 44 being rotated by servo motor 47 through a zero backlash gear drive 48 to provide the rotational movement of the tape head 20 about a vertical or C-axis. The ram 46 is also vertically movable within the saddle 36 by a servomotor and ball screw drive 49 (not shown in detail) to provide vertical or Z-axis movement of the tape head 20. The actual position of the tape head 20 with respect to the Z-axis and C-axis are derived from feedback position sensors, such as resolvers or the like, associated with servo motors 47 and 49.

Figure 2:
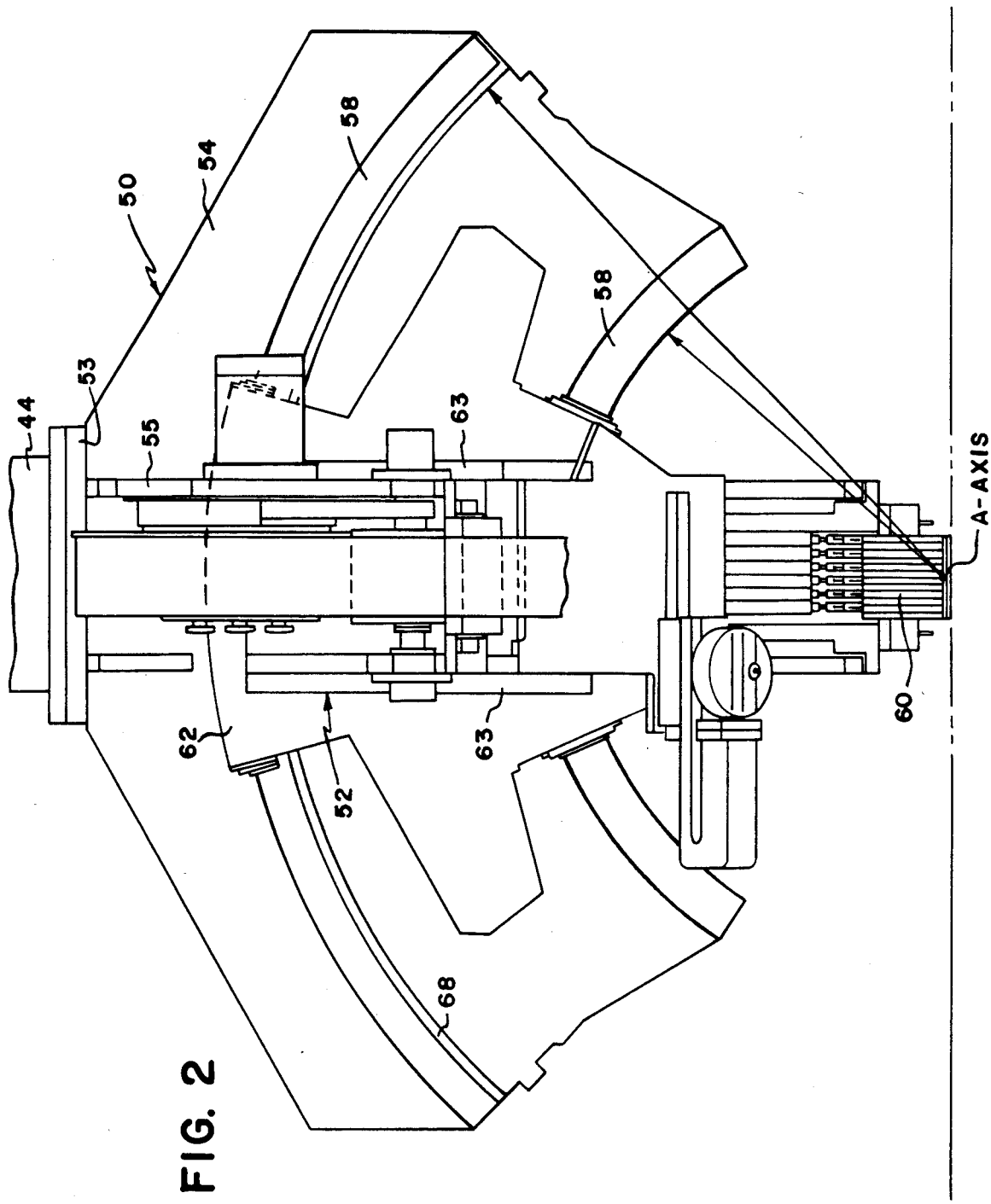
FIG. 2 is a front elevational view of the oncoming tape laying head illustrated in FIG. 1.
Figure 3:
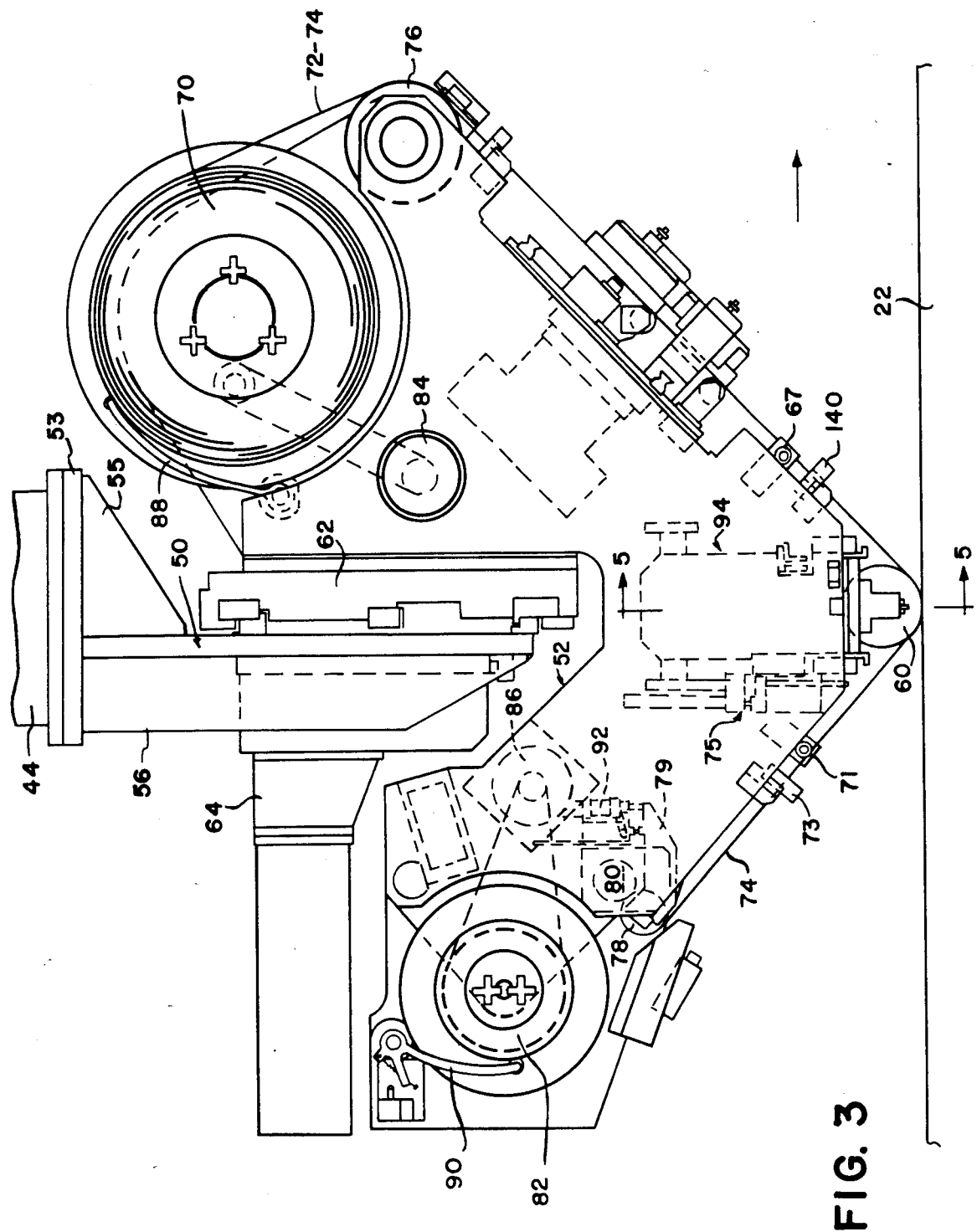
FIG. 3 is a right side elevational view of the tape laying head illustrated in FIG. 1 with the tape laying movement of the head proceeding from left to right.
Figure 4:
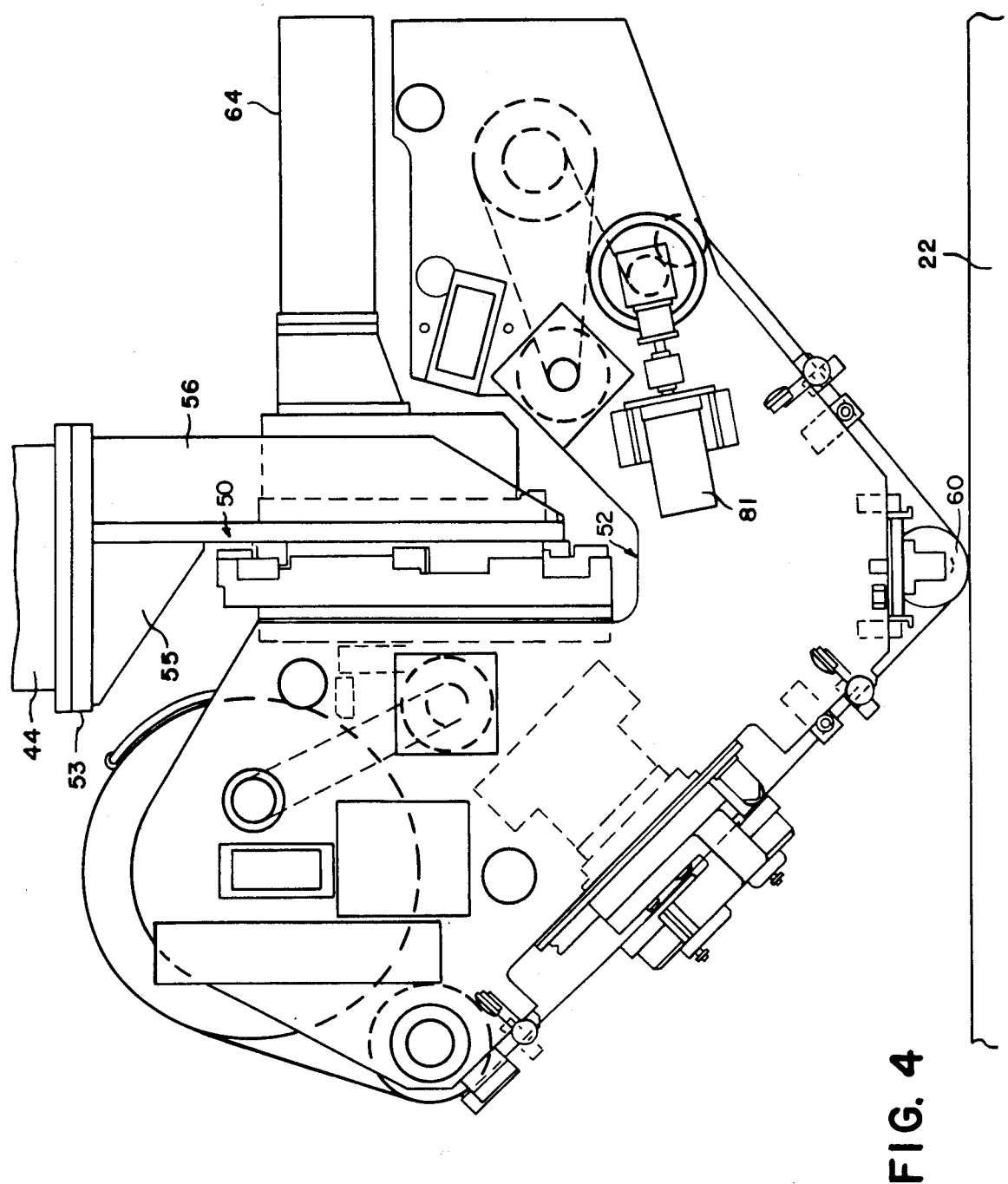
FIG. 4 is a left side elevational view of the tape laying head illustrated in FIG. 1 with the tape laying movement of the head proceeding from right to left.
Figure 5:
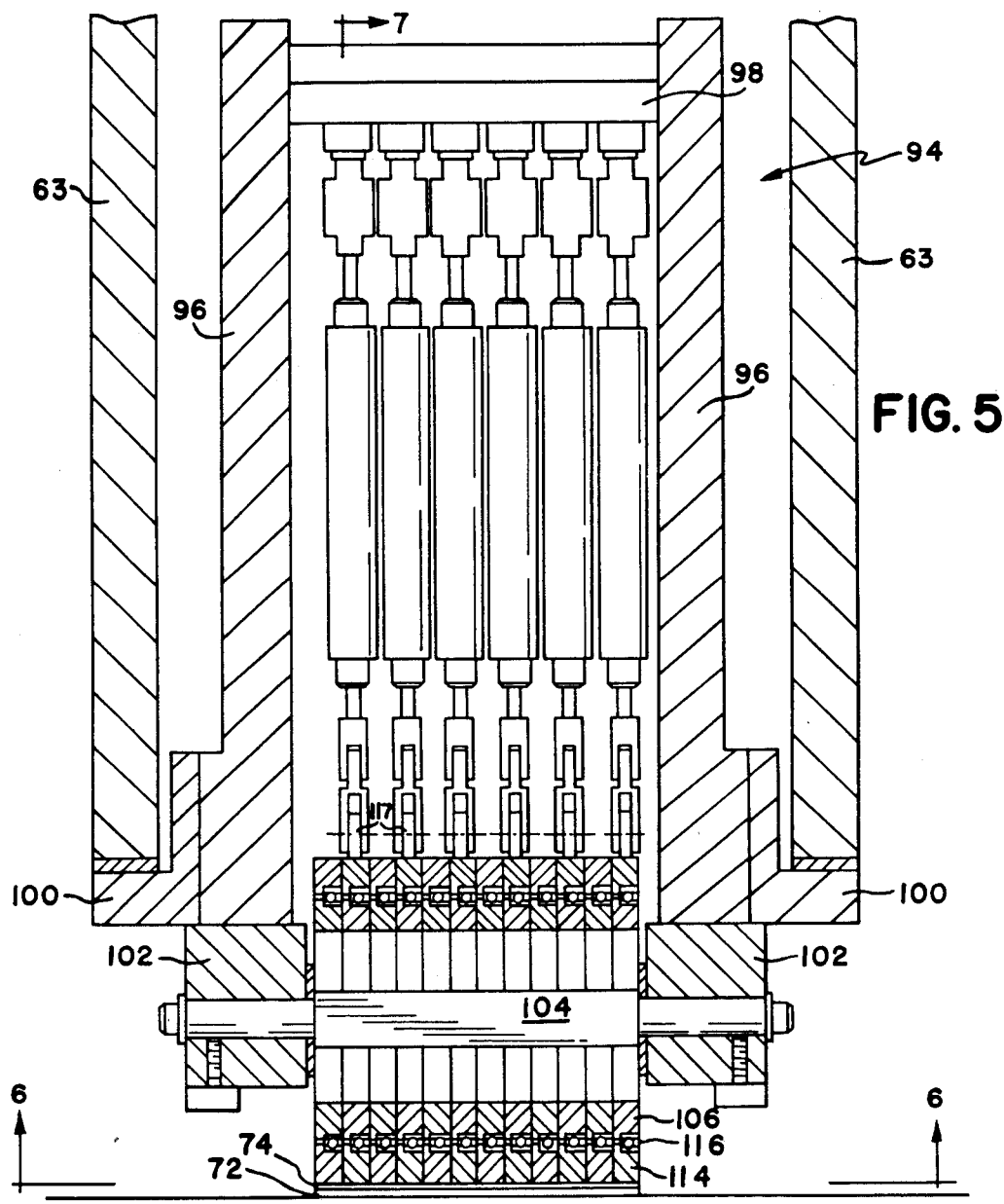
FIG. 5 is a fragmentary enlarged cross-sectional view of the segmented laydown roller of the tape laying head taken vertically through the section line 5—5 illustrated in FIG. 3.
Figure 6:
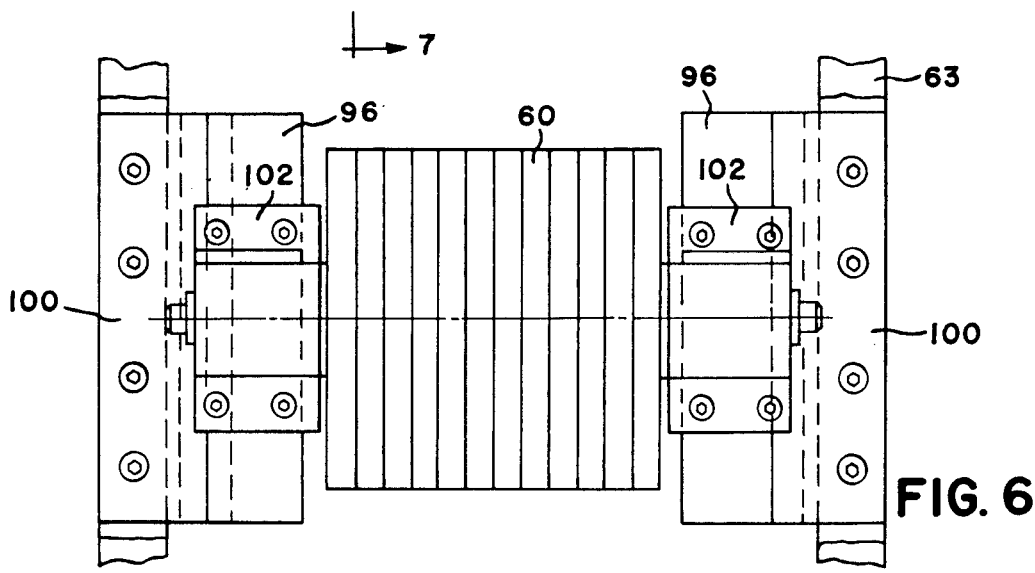
FIG. 6 is an underside view of the portion of the tape head illustrated in FIG. 5 taken along section line 6—6 of that figure.

The fifth axis of movement of the tape head, termed A-axis rotational movement, is best appreciated by comparing FIGS. 2, 3 and 4, which illustrate a two-part frame of the tape head 20, including a suspension frame 50 and a saddle-shaped frame 52 which carries the tape-handling mechanism. The suspension frame 50 comprises a horizontal mounting plate 53 for securing the frame to the torque tube 44 and a broad vertical faceplate 54 braced to the mounting plate 53 by corner brackets 55 on the front side of the faceplate and plate stiffeners 56 on the rear. On its front side, the faceplate 54 carries a pair of precision ways 58 concentric upon the A-axis of the machine. The A-axis is tangent to the underside of the segmented tape laydown roller 60 at its axial center when the roller is in laying position, as later explained. The A-axis is perpendicular to the plane of FIG. 2, and projects as a point in that plane.

The saddle-shaped frame 52 of the tape laying head 20 includes a turntable 62 mounted on the precision ways 58 of the suspension frame 50. The turntable 62 is rotated about the A-axis by a servo motor and gear box 64 mounted on the faceplate 54 which drives two pinions (not shown) engaged with zero backlash with the opposed flanks of a rack 68 secured on the mating face of the turntable 62 (FIGS. 3 and 4). The precision ways 58 on the suspension frame 50 preferably provide 30° of A-axis movement either side of center, and the rotational drive of the torque tube 44 in the ram 46 of the machine is designed for C-axis rotational movement of 190° in either direction of rotation from a zero reference. A feedback position sensor such as a resolver or the like associated with the servo motor 64 provides a signal representative of the actual positions of the tape head 20 with respect to the A-axis.

There is an internal coordinate system for positioning the tape head 20 which is based on the center point of the laydown roller 60. The origin for the internal coordinate system is floating or moveable so that the machine may be used easily with many different size mandrels with precision. The signals from the feedback position sensors for the X, Y, Z, A, and C axes are used to locate the position in space of the center of the tape laydown roller 60. By matching these positions with the preprogrammed positions from a controller unit 35 (FIG. 1), the tape head 20 can be moved to lay tape courses on the mandrel surface and build plies of the courses into laminated articles.

The Tape Head Proper

The previously mentioned saddle frame 52 of the tape head proper comprises a pair of spaced plates 63 each respectively secured to the saddle shaped frame 52. A tape supply reel 70 mounted between the plates 63 at the upper forward end of the frame, i.e., at the upper right in FIG. 3, carries a supply of the composite tape 72 adhered to a releasable backing paper 74 which separates the coils of composite tape on the supply reel. From the supply reel 70, the tape 72 and backing paper 74 pass around an idler roller 76 with paper side in contact with the roller, from which it proceeds in a straight line down to the laydown roller 69 at the very bottom of the tape head. A guide roller 67 removes any curl from the tape between the idler roller 76 and laydown roller 60 before it enters feedback sensor 140. The adaptive feedback sensor 140 generates a signal which indicates whether the tape 72–74 is centered on the laydown roller 60. The laydown roller 60, moving from left to right in FIG. 3, applies pressure to the composite tape to adhere it to the underlying lay surface of the mandrel 22 and to ensure it lies flat.

As the tape head 20 is moved along a path or track, a tape course is laid on the surface and the paper backing tape 74 is simultaneously peeled or released from the composite tape 72 as the latter is laid. The paper backing tape 74 then proceeds diagonally upwardly, being trained in an S-shaped path about a pinch roller 78 and a driven roller 80, and thence to a paper take-up reel 82 at the back end of the tape head 20. A guide roller 71 is used to remove the curl from the backing paper before entering the tape up reel 82 and guidance sensors 73. A photoelectric feedback sensor 73 in combination with a similar sensor for the supply reel generate signals which ensure that when a course of tape is started, it always is initiated on the edge of the rollers no matter where the last course ended.

The tape supply reel 70 and the paper take-up reel 82 are each respectively driven by timing belts from separate torque motors 84 and 86, respectively, and are regulated to maintain a predetermined level of tension on the paper backing tape 74. Both reels are provided with spring-biased follower arms 88 and 90 which sense the changing radius of the tape on each reel to adjust their respective torque motors to maintain the preset tension.

The composite tape 72–74 is drawn from the supply reel 70 at times merely by the advancing movement of the tape head 20 over the lay surface after the leading end of the tape is anchored to the lay surface, but is additionally positively driven at the beginning and at the end of each tape course, i.e., before sufficient adhesion is developed between the composite tape 72 and the lay surface to anchor the tape to the lay surface as the tape laying head moves away, and is also positively driven near the end of the tape course when the adhesion of the composite tape 72 to its paper backing tape 74 may be insufficient to prevent separation of the precut end of the composite tape from its backing. The tape is also positively driven to reposition and realign the tape within the tape head 20 between the end of one course and the start of the next course, i.e., when the laydown roller 60 is not in contact with the mandrel.

The Tape Drive

The tape drive comprises the two aforementioned rollers 78 and 80 about which the paper backing tape makes the S-turn enroute to the take-up reel 82. The upper one of these rollers, roller 80, is driven by a reversible servo motor 81 seen on the left side elevation (FIG. 4) mounted on the outside of the saddle frame 52 of the tape head and driving the drive roller 80 through a right-angle gear box. The lower roller, 78, which functions as a pinch roller, is mounted on a rocker arm 79 (FIG. 3), the opposite end of which is connected to a double-acting, short stroke air cylinder 92 which is energized either to open or close the nip between the two rollers.

When it is desired to drive the tape in either direction, the air cylinder 92 is energized to close the nip between the rollers 78 and 80, and the servo motor 81 is energized in the appropriate direction, unloading one or the other of the torque motors 84 and 86 serving the take-up reel 82 and the supply reel 70, causing one to play out tape and the other to reel it in. The same arrangement, i.e., with the nip of the two rollers closed, similarly serves as a brake which is set whenever the tape head is lifted out of contact with the lay surface.

When the air cylinder 92 is energized to open the nip between the two rollers for the intermediate portion of the tape course, the releasable backing paper remains entrained in its reverse bend about the two rollers. When the tape is moving relative to the tape head 2 by means other than the drive motor 80, as during the laying of a tape course, then the wrap of the backing tape around the drive roller 80 generates sufficient friction to drive a resolver attached to the motor to record the amount of tape laid by measuring the number of turns of the drive motor 81, whether or not the drive motor is energized to draw tape from the supply reel.

The Laydown Roller Subassembly

The laydown roller 60 is part of a roller subassembly 94 best seen in FIGS. 5–9, 12, and 13. The subassembly 94 includes a pair of parallel plates 96 which are connected together in spaced relation by four posts 98 and secured to the underside of the spaced plates 63 of the saddle frame 52 by angle brackets 100.

Secured to the underside of the subframe 94 is a pair of mounting blocks 102 spanned by a support shaft 104 for the laydown roller 60. Comparing FIGS. 5 and 7, it will be seen that the support shaft 104 is square in cross section and that each of the 12 segments or rollers of the laydown roller 60 comprises a disk-like central hub 106 having a vertical slot 108 to receive the support shaft 104 in sliding fit. A pin 110 extends longitudinally along the slot in the hub 106 and passes through a corresponding hole in the support shaft 104 to maintain the hub in floating relation with the support shaft but positioned axially thereof. A compression spring 112 surrounds the pin 110 and biases the roller hub to a fully retracted position on the support shaft 104 when the tape head 20 is lifted from the lay surface. The rotatable portion of each segment of laydown roller 60 is confined to the rim 114 which is separated from the hub 106 by ball bearings 116.

Bearing downwardly upon the rim 114 of each segment of the laydown roller 60 is a roller 117 of a rocker arm 118, alternate rocker arms being journaled on shafts 119, 121 on opposite sides of the roller subframe 94, and each being urged against the tops of the rims of the roller segments 60 by a double air cylinder 120. Each air cylinder 120 has its lower piston rod 122 connected by means of a clevis to an associated rocker arm 118 and has its upper piston rod 124 received in the frame of a load cell 126 secured to a mounting block 128 pivoted on a shaft 130 spanning the sideplates of the subassembly frame.

Figure 7:
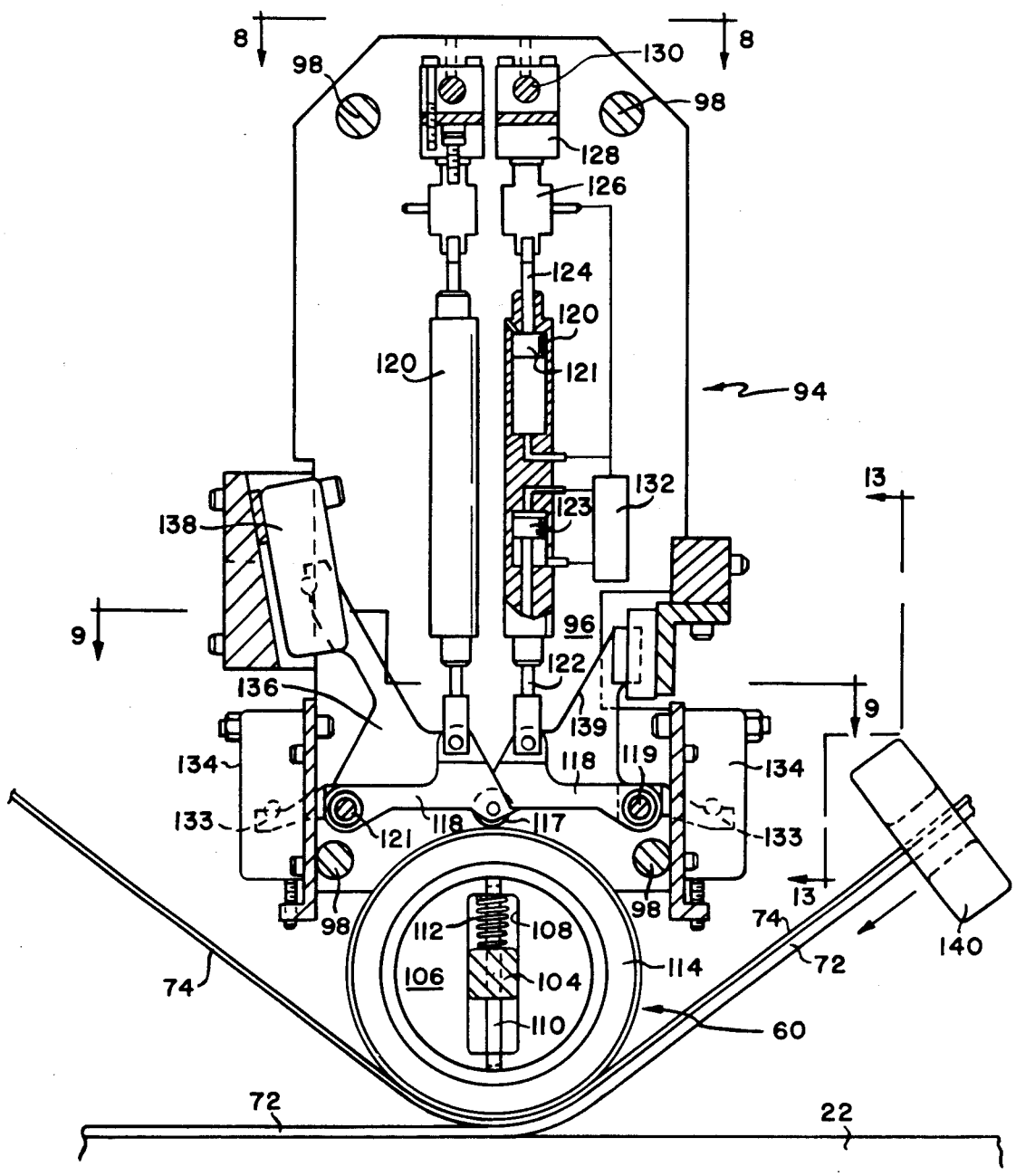
FIG. 7 is a partially cross-sectioned, side elevational view of the laydown roller subassembly of the tape head shown in neutral laying position.
Figure 8:
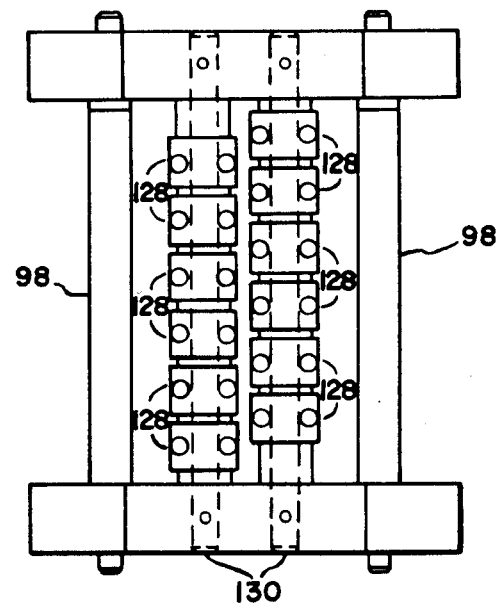
FIG. 8 is a top view of the laydown roller subassembly taken along the section line 8—8 of FIG. 7.

One of the two cylinders shown in FIG. 7 is shown in diagrammatic cross-section to facilitate the description of its structure and its function, but the actual air lines to the cylinders are omitted for clarity and are shown only diagrammatically in connection with the sectioned cylinder. The air cylinders 120 maintain a predetermined level of pressure on the rocker arms and hence the rollers for the laying of the tape. The neutral position of the segments of laydown roller 60 relative to their common support shaft 104 is the position depicted in FIG. 7 where the rocker arms 118 are urged downwardly upon the segments of the roller 60 by pressurizing the upper piston 121 of cylinder 120 on its underside, which is vented above, and by pressurizing the lower piston 123 from above, which is vented below, through a solenoid valve 132.

The normal laying position of the rollers 60 is maintained as necessary by the adaptive control of the A and Z-axes still to be described. In that predetermined position, the piston 123 of the lower cylinder is spaced approximately 0.020 inches from the top of the lower cylinder so that when the laydown roller starts or finishes a course of tape which has been cut at an angle to the axis of the tape, the predetermined laying pressure can be applied or removed sequentially from segment to segment of the laydown roller 60. This is important at the conclusion of each such tape course, because, if the laydown pressure were applied uniformly across the breadth of the tape during the conclusion of a course, the leading end of the next course of tape would additionally adhere to the lay surface. A selective application of pressure is effected by reversing the application of air pressure to the lower piston 123 through the valve 132 in FIG. 7, i.e., pressurizing the lower piston 123 of the cylinder from below while venting it above, thus lifting the associated rocker arm 118 by the amount of the head space above the lower piston 123.

In all other circumstances, i.e., in laying the tape throughout the mid-portion of the tape course, the preset laydown pressure is maintained as earlier described with the piston 123 of the lower cylinder extending itself to maintain pressure when its associated roller segment encounters a depression and one or both cylinders retracting as necessary to accommodate any local hump or rise in the contour of the lay surface. The transducers 126 do not enter in the control arrangement as such, but are used to provide a record of the individual laying pressures to an off-site recording instrument.

When in the neutral position, as shown in FIG. 7, the laydown roller 60 exerts a substantially constant pressure on the composite tape 72 to adhere the tape to the underlying surface 22. The force of the rocker arms 118 on the individual segments or rollers is partially balanced by the force of the tape resisting this pressure along with the springs 112. Only when the mandrel surface 22 is identical to where the tape head is programmed to be, is there the correct balance and, hence, correct laying conditions on the tape. If the surface 22 is lower than expected, then the ram 46 must be extended to maintain contact with the surface and to ensure a constant tape length between the tape sensor and the laydown roller. Further, if the tape head tilt does not match the slope of the contour on which the tape is laid, then the roller segments will not be parallel with the supply reel, rewind reel, idler roller, and pinch rollers.

This will cause the composite tape to wander from the center line of the head and is undesirable. To ensure that the correct laying conditions are maintained, a number of sensors for the A, C, and Z-axes are used to sense abnormal tape laying conditions.

Adaptive Sensors For A and Z Axes

Figure 9:
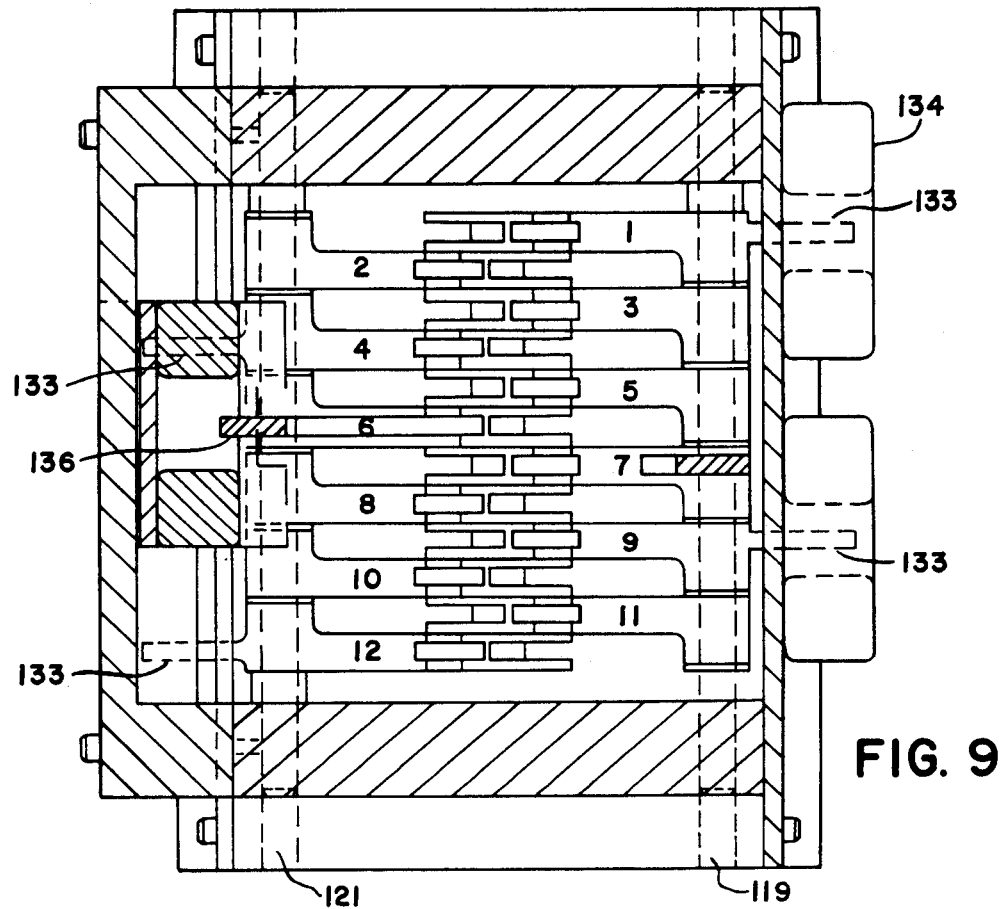
FIG. 9 is a sectional view of the laydown roller subassembly taken at an intermediate level along section line 9—9 of FIG. 7.

Comparing FIGS. 7 and 9, it will be seen that each of the rocker arms 118, for the roller segments numbered 1, 4, 9, and 12, is provided with an arm 133 extending rearwardly from the rocker shafts 119, 121 upon which the rocker arms are journaled, and that each of the rearwardly directed arms 133 extends into the interior space of photodetectors 134, each having a C-shaped frame, so as to interrupt the light beam thereof. The neutral position for the arms 133 within photodetectors 134 is better seen in FIG. 13. In addition thereto, the rocker arm bearing upon laydown roller segment No. 6, flanking the central plane of the laydown roller 60, is provided with an upstanding arm 136 which similarly extends into the C-shaped frame of a photodetector 138 to interrupt partially the light beam thereof.

Collectively, the photodetectors 134 and 138 provide a means of ascertaining whether the roller segments bearing upon the tape at its edges, and the segment adjacent the central plane of the roller gang, are in the neutral or desired laying position of FIG. 7. If either of the roller segments Nos. 1 and 12, when laying 6-inch tape, or roller segments Nos. 4 or 9 when laying 3-inch tape, is individually disposed either up or down so as to disturb the balance of the signals generated by their respective photodetectors 134, the imbalance is used to energize the A-axis position control in one direction or the other to change the tilt of the tape head 20 to restore that balance. If, on the other hand, the centrally-located roller segment No. 6 should change its elevation relative to the mounting shaft 104, its associated photodetector 138 signals the Z-axis position control for corrective action to raise or lower the roller segment No. 6 until the neutral signal value is restored. In each case, corrective energization of the appropriate servomotor is accomplished in combination with tape head positioning through position control circuitry, hereinafter described, for a particular axis.

Figure 14:
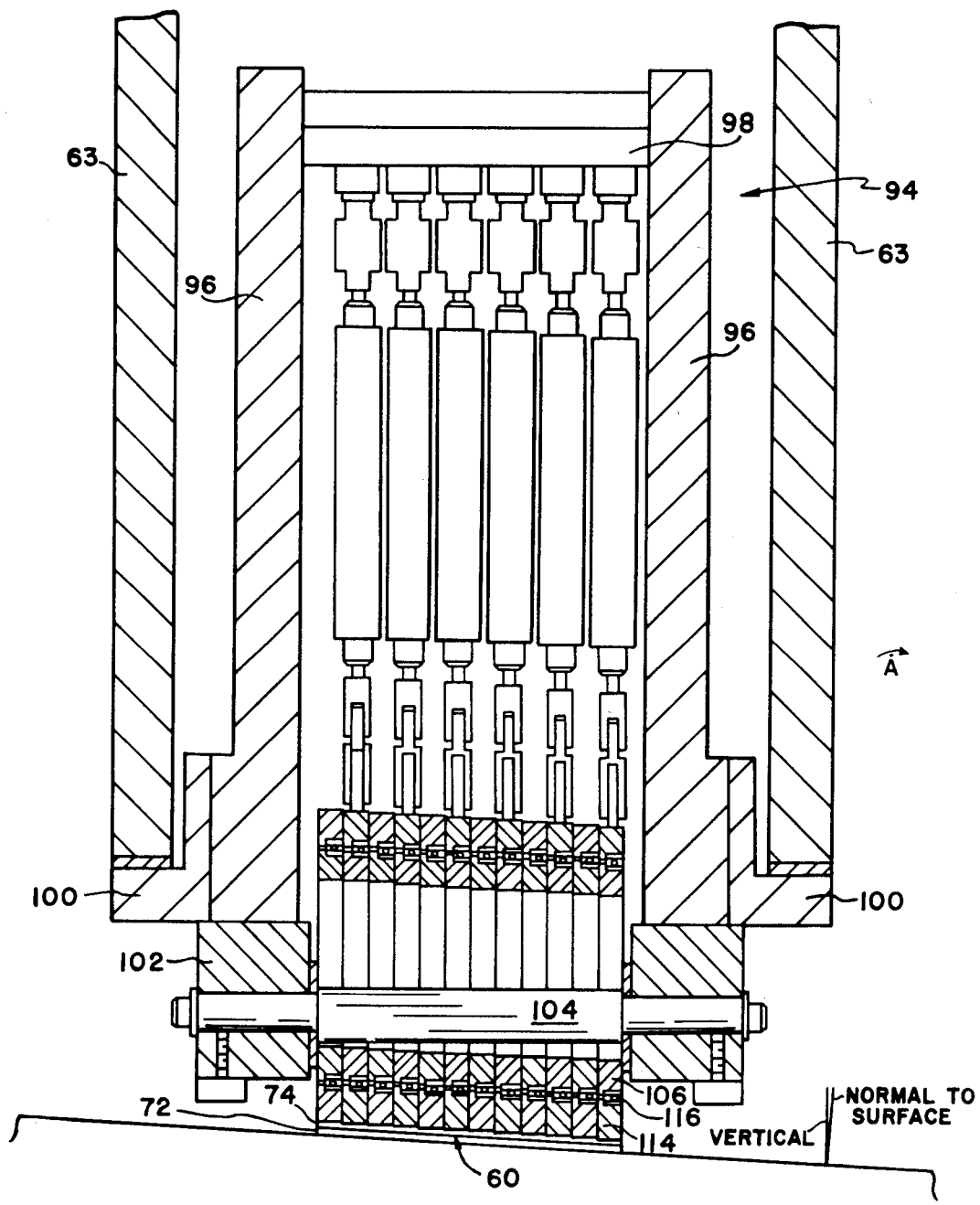
FIG. 14 is an elevational view of the laydown roller subassembly illustrating a condition calling for adjustment of the A-axis and possibly the Z-axis.
Figure 15:
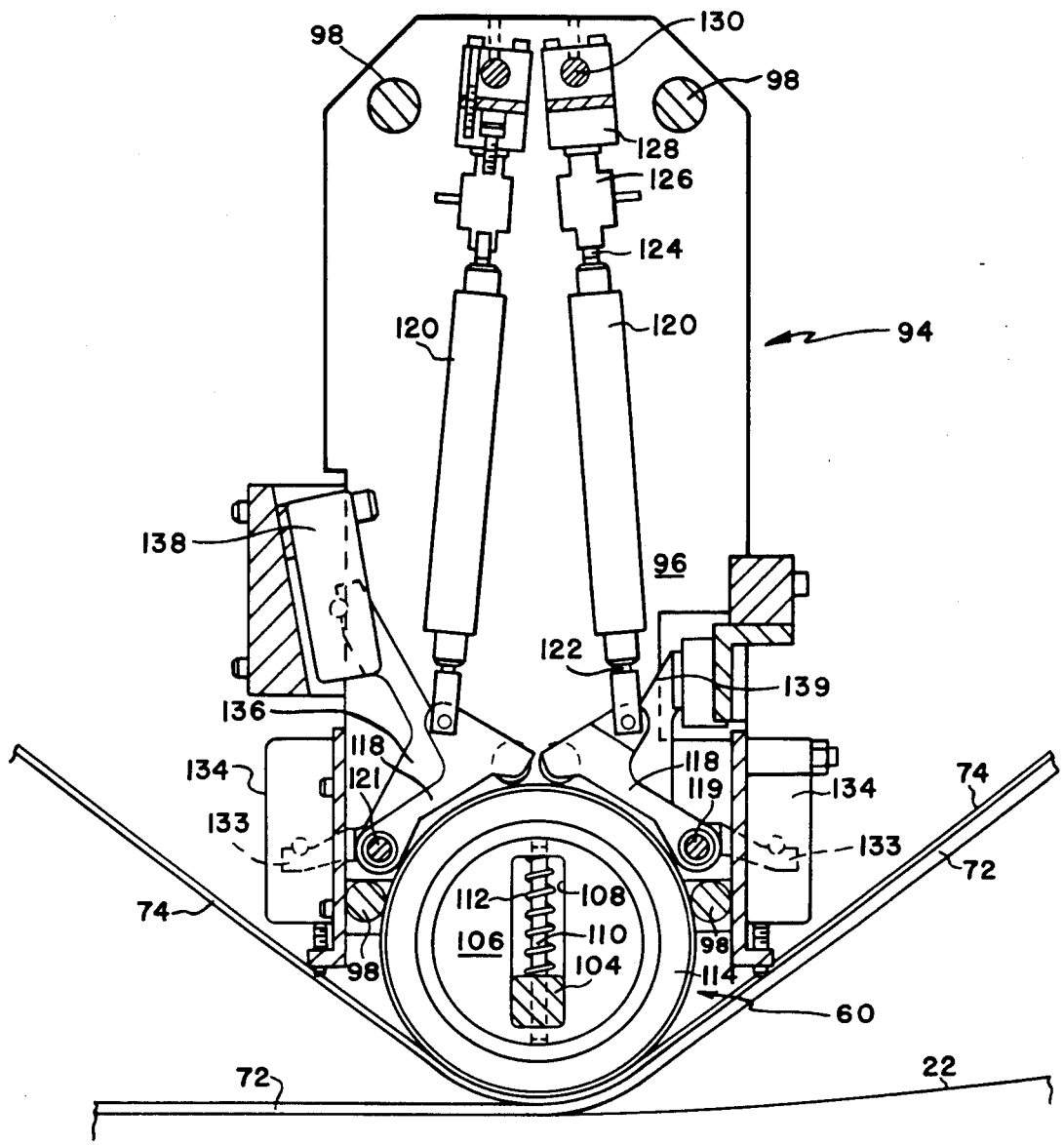
FIG. 15 is a side elevation of the laydown roller subassembly in the condition depicted in FIG. 14.

FIGS. 14 and 15 illustrate an exaggerated tape laying condition where the A-axis and Z-axis require correction. In FIG. 14, it is seen that the mounting shaft 104 is lower than the neutral position which is indicative that it is not parallel to mandrel 22, i.e., the actual surface is higher than the representative surface. The length of the tape between the tape sensor and the laydown roller 60 is shorter than that designed for and must be lengthened to the neutral position. The tape laying head 20 should be moved upwardly along the Z-axis to achieve the neutral balance position.

In addition, the mounting shaft is not equally positioned with respect to all the segments of roller 60. The rim 114 of the roller on the left side of FIG. 14, which is that pictured in FIG. 15, is lower than the roller on the right side of the gang. This is caused by an incorrect tilting of the tape laying head along the A-axis. As pictured, the tape laying head 20 is vertical in FIG. 14 rather than being tilted slightly to the right such that the roller gang will travel normal to the side of the contour. If the laydown roller 60 is not parallel to the supply reel, rewind reel, idler roller, pinch rollers, etc., this will cause the tape to wander from the center line of the head which is undesirable.

Figure 12:
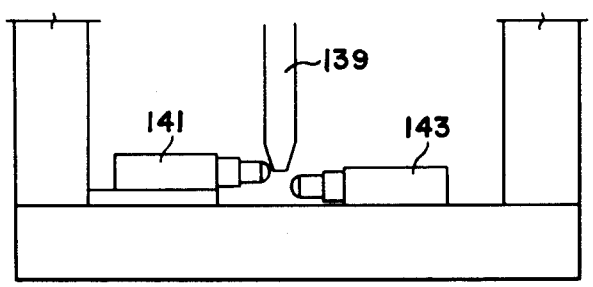
FIG. 12 is a top view of a safety switch assembly operated by the laydown roller illustrated in FIG. 7.
Figure 13:
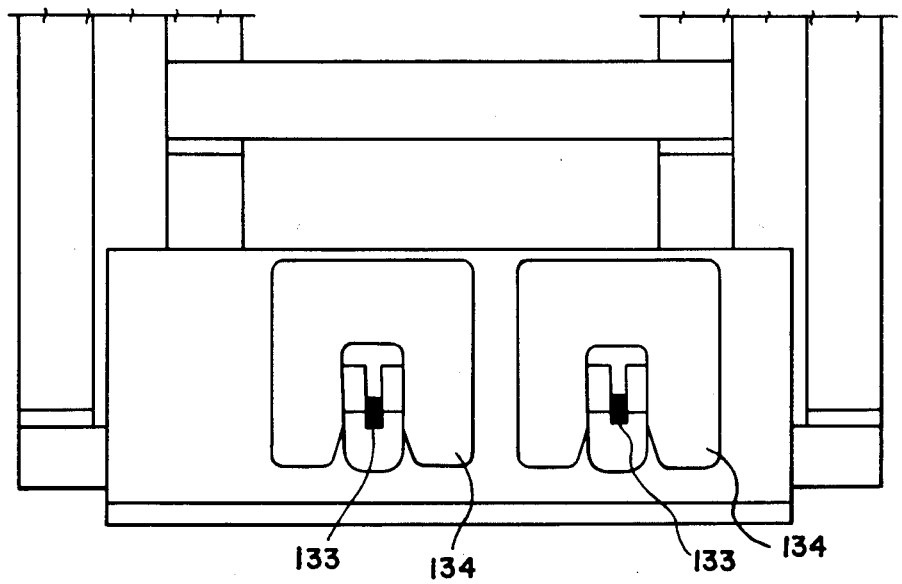
FIG. 13 is a side view taken along section line 13—13 in FIG. 7 illustrating two of the four photodetectors used for A-axis adaptive control.

Not part of the adaptive control but serving to protect the mechanism in the event of malfunction or overtravel during manual control, the rocker arm 118 of the No. 7 roller segment is provided with an upstanding leaf 139 which is poised for the sequential operation of two microswitches 141 and 143 shown in FIGS. 12, 13 in the event the laydown roller 60 rises abnormally. The first microswitch 141 encountered interrupts power to the Z-axis servomotor and the second microswitch 143 interrupts power to the entire machine to provide an overtravel protection system for the tape head 20.

Adaptive Sensor For C-Axis

As the tape head 20 moves along its preprogrammed path during the laying of a tape course, the position of the composite tape 72 relative to the axial center of the laydown roller 60 is constantly monitored by a pair of photodetectors 140 each of which is adjusted to intercept an edge of the tape 72 in such a manner as to render signals of equal value when the tape is centered on the laydown roller 60. These photodetectors 140 are located (FIGS. 3, 7, and 10) on each side of the tape path so as to monitor the double-layered tape just before it reaches the laydown roller 60. With this positioning, a reasonably accurate reading of the amount of the sideward drift, if any, of the center of the tape from the center of the laydown roller 60 can be is monitored.

Figure 13A:
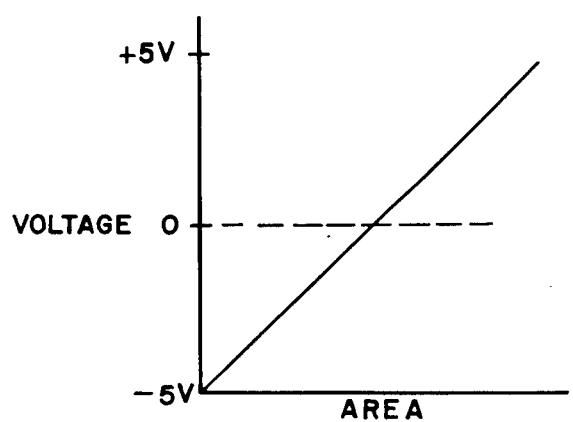
FIG. 13A is a functional representation of the outputs of the photodetectors for different positions of the actuator arms sensed.

For this service, the photodetectors 140 are mounted for equal adjustment toward and away from the central plane of the laydown roller 60, and are adapted to increase or decrease the lateral distance between them to compensate for variations in the tape width from its nominal widths of 3 and 6 inches. The equal distance of the photodetectors 140 in opposite directions from the central plane of the laydown roller provides a balanced signal when the tape is centered on the laydown roller 60, and the distance between the two photodetectors 140 relative to the width of the tape determines the strength of the balanced signal received from the two sensors when the tape is centered. Thus, as the centerline of the tape drifts away from the central plane of the laydown roller 60, the signals received from the tape-edge photodetectors 140 become unbalanced, and their imbalance is used to generate a command to the C-axis positioning control to rotate the torque tube 44, and thus the tape head 20, until the balance is restored, i.e., until the tape is recentered beneath the laydown rollers. FIG. 13A illustrates a representative output voltage as a function of the area interrupted by the tape for each of the photodetectors 134, 138, and 140.

Figure 10:
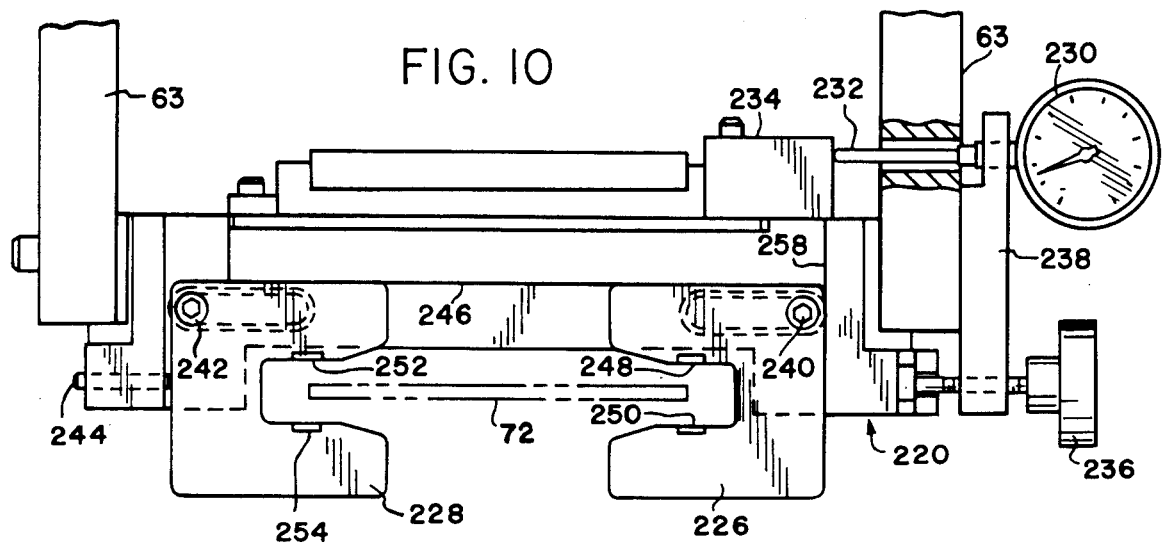
FIG. 10 is a partially cross-sectioned front view of the photodetector assembly and calibrating mechanism used for the C-axis adaptive control illustrated in FIG. 7.
Figure 11:
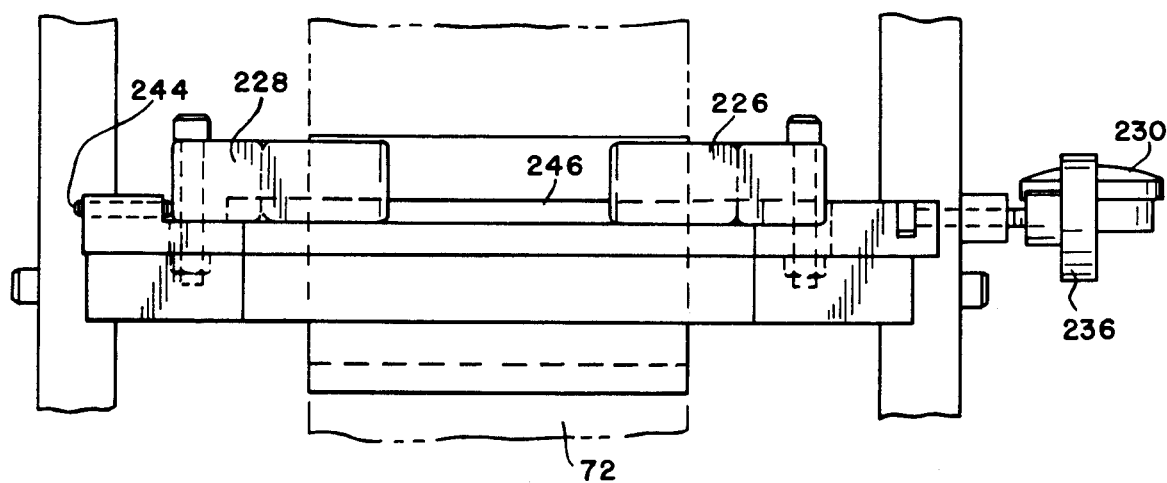
FIG. 11 is a bottom view of the photodetector assembly illustrated in FIG. 10.

FIGS. 10 and 11 illustrate in detail the assembly for the C-axis sensor 140. The assembly comprises a slidable carriage 220 which may be positioned by a knob 236 with respect to a stationary mounting plate 63. Mounted on the carriage 220 are a pair of C-shaped photodetector blocks 226 and 228 which are slidably supported by a ledge 246 and bolts 240 and 242, respectively which are passed through an aperture in each block and retained in slots in the moveable carriage 220. The composite tape 72, shown in phantom, rides along the guide rollers 67 (FIG. 3) and passes through the channel formed by the photodetector blocks 226, 228. The edges of the tape 72, if it is perfectly centered, will interfere with light being passed between photodetector 248 and light emitting diode (LED) 250 and photodetector 252 and LED 254, respectively, at approximately 50% of the transmission capability. If the voltages output by the sensor pairs are not substantially equal to each other, then the edge of the tape has walked away from the center line path, and the tape head 20 should be turned in that direction to cause that edge to move back into interference with the sensor path. Similarly, as one tape edge walks away from one sensor, the opposite will occur at the other sensor where its output will be less than nominal as the edge covers more of the sensor area. This provides a check on the tape position by the opposite sensor and generates a differential reading which can be used to rebalance the tape position adaptively.

The assembly also provides a way of visually determining whether the photodetector is exactly calibrated and a facile method of changing the calibration between different sizes of tape. Generally for the tape laying apparatus illustrated, a 3 inch or a 6 inch composite tape width is used. A position sensor probe 232 which touches a calibration block 234 of the moveable carriage 220 provides an indication of the relative position of the slide assembly with respect to a fixed position such as carrier plate 63. This relative positioning is indicated visually on a dial indicator 230 to allow a operator by turning knob 236 to obtain a calibration reading on the dial and visually inspect dial 230 periodically to determine if the calibration is still valid.

Figure 13B:
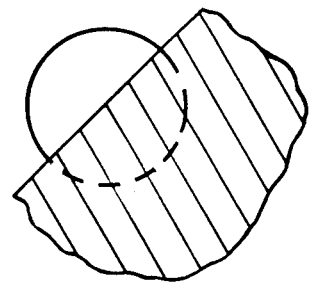
FIG. 13B is a pictorial representation of a photodetector covered partially by the edge of the composite tape.

The actual calibration of the sensor will now be more fully described with reference to FIGS. 10, 11, 13A, and 13B. FIG. 13B shows the composite tape 72 covering approximately half of the area of the photodetector 226 which would produce a zero or balanced output voltage from the function shown in FIG. 13A. Initially, photodetector block 226 is mounted on the ledge 246 of slide assembly 220 and slid to where it abuts a reference wall 258 of slide assembly 220. The bolt 240 is then tightened to fix the position of block 226 with respect to the slide assembly 220. Next the block 228 is mounted on the ledge 246 and aligned by a set screw 244. The set screw 244 is adjusted to move the block 228 toward block 226. The set screw 244 is adjusted until the centers of the photodetector blocks 226, 228 are exactly the nominal width of the composite tape apart, in our example 6 inches. The bolt 242 is then tightened to fix the sensor block 228 with respect to the slide assembly 220 and the sensor block 226. After this initial portion of the calibration is completed, the photodetector centers will be exactly 6 inches apart and, therefore, need only to be centered on the tape 72 (center of C-axis).

The knob 236 adjusts the slide assembly 220 along ledge 246 (FIG. 10) while the tape 72 is positioned exactly along the center line of the tape path. This is accomplished by taking a length of tape and manually positioning it with respect to the center axis of the lay down rollers 60 and the supply reel 70 such that it is under normal tension and does not include any wrinkles or curves in the path. The knob 236 is then adjusted while electrically sampling the outputs of the photodetector blocks 226, 228 to obtain a zero output from each. The set screw 244 can be readjusted if a zero reading cannot be obtained from each sensor. After the entire assembly has been calibrated, the reading from dial indicator 230 is recorded and that data stored as the calibration constant. If the slide assembly has to be moved, such as for repairs, cleaning, tool change over, etc., the device can thereafter be rapidly calibrated by adjusting the knob 236 to bring the slide assembly back to the position which produces the original reading on dial 230.

The same technique and ease of calibration is available when changing to tapes of a different width. It is known that the centers of the sensor blocks 226 and 228 are exactly 6 inches apart and are defined by the extent of the set screw 244 and reference wall 258. A pair of 1½ inch blocks can be inserted between the wall 258 and sensor block 226 and the set screw 244 and sensor block 228 to provide a calibration for changing the tape laying machine over to a 3 inch tape. The calibration and settings will not have changed only the position of the sensors blocks 226, 228 relative to the reference positions. By accurately providing the auxiliary blocks with the correct width, the sensor blocks 226 and 228 may be moved exactly 1½ inches along the ledge 246 to correctly reposition them with respect to a 3 inch tape. The bolts 240 and 242 are then tightened to secure them in that position. Reversal of the method permits a change from a 3 inch to a 6 inch tape. Thus, not only has a facile method of calibrating the C-axis adaptive control with respect to the pressure roller center been shown, but also a rapid change between tape widths without the necessity of recalibration has been advantageously illustrated.

The Control Logic

Figure 16:
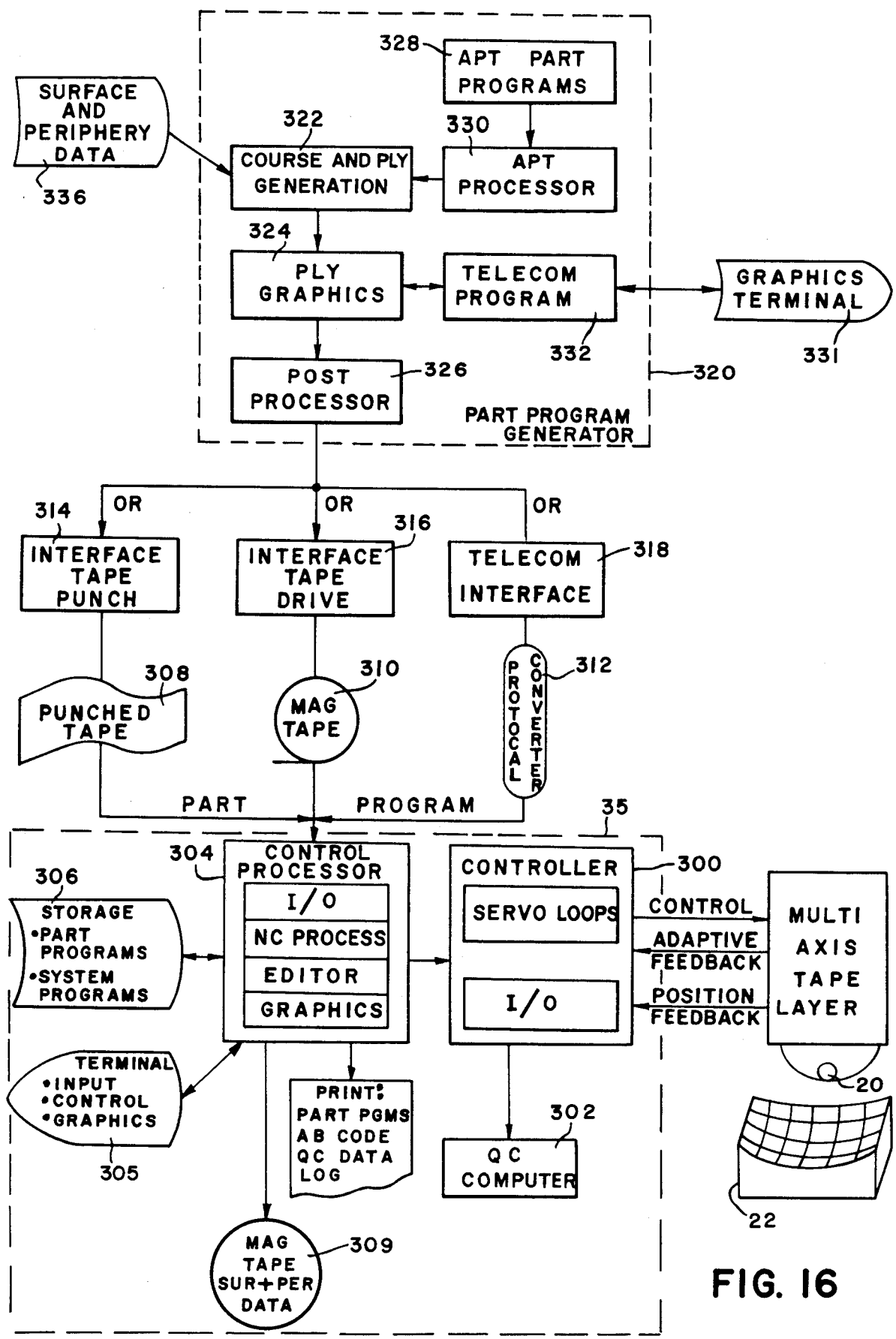
FIG. 16 is a detailed functional block diagram of the control system for the tape laying machine illustrated in FIG. 1.

As more fully seen in the block diagram of FIG. 16, the motions of the tape laying machine are regulated by the control unit 35 (FIG. 1) including a controller 300 which produces electrical control signals and receives position and adaptive feedback signals to position the tape laying head 20 according to positions commanded by a part program. The part program defines the desired position in space of the tape laying head 20 and the position feedback signals indicate the actual position of the head to the controller 300. The adaptive feedback signals indicate the relation of the actual surface to the mathematically derived surface and the tape laying conditions. The difference among these signals is nulled in a closed loop until the actual position equals the desired position such that the tape tracks a natural path and is laid in a precise manner. Signals indicating the difference between the actual and desired positions may be provided to a satellite quality control computer 342 to determine whether the tape is being laid correctly and to store the results of the actual lay.

The controller 300 is a CNC machine which can execute an extensive and detailed part program, a portion at a time, by being periodically supplied with sequentially generated control blocks. These control blocks contain detailed motion and control information in each block and are comprised of series of standardized control function implementations for the particular tape laying machine. Executing the control blocks causes the actual physical motion and control of the tape laying head 20 along a natural path.

In the present system the controller 300 is implemented as an Allen Bradley 8200 CNC controller, or equivalent CNC controller, which can be programmed to regulate motion and control of a multi-axis tape laying machine. The program of the controller 300 implements a closed loop control which is given its desired position commands by a control processor 344. These position commands are executed by the controller 300 to position the tape head 20 in a normal closed loop manner. These positions are modified for actual surface conditions for the A, C, and Z-axes by the adaptive feedback signals mentioned previously.

The adaptive control actively regulates the vertical positioning of the laydown roller 60 (Z-axis positioning) to maintain surface contact with a constant application pressure and a substantially constant tape length between the cutters and laydown roller, actively regulates the A-axis positioning to maintain an equal length of tape from side to side, and actively regulates the C-axis positioning to maintain the tape squarely under the rollers 60.

The control blocks of machine instructions are generated to the controller 300 by a control or interpreter processor 344. The control blocks are generated by the interpreter processor 344 from part programs generated by a part program generator 320 or previously generated part programs stored in a system storage unit 306. The part programs, comprising a plurality of tape blocks, are in a geometric format relative to the natural tape path of each course. The information for each course consists of one tape block describing the end cuts of a course and one or more tape blocks describing the course centerline of the path. This format contains all the geometric information for one course of a ply but is not machine specific.

The controller 300, however, only recognizes regular machine instructions or commands representative of a single machine action or canned cycle machine instruction commands indicating a plurality of machine actions in a single block. The course tape blocks contain complex information which command many more machine actions, such as axis motion, sheer and cutter control, roller control, and other miscellaneous functions. Therefore, this complex course data must be interpreted and converted into the machine instructions that the controller 300 recognizes. This is the function of the interpreter processor 344 which expands the tape course blocks into detailed motion and control blocks of machine instructions recognizable by the controller 300.

The part program generator 320 accepts basic article information from a surface file 336 and periphery data from an APT part program 328 to automatically generate the tape courses based on a natural path which are output as a part program from a post processor 326. The tape course information or part program from the post processor 326 can be alternatively communicated to the control processor 304 through any of the three interfaces 314, 316, or 318. The part program may be interfaced through a tape punched paper 314 by punch tape 308, output on magnetic tape 310 from a tape drive 316, or interfaced directly through a telecommunications interface 318 and a protocol converter 312.

The information used to generate the tape course data from the surface file 336 and periphery data from APT part program 328 is a rectangular array of points obtained from a mathematical description of the surface of the mandrel 22, the peripheral outline of the plies to be laid, one or more control lines indicating areas where the gaps between courses are to be held at a close tolerance, and the angle at which the courses of each ply should be laid with respect to the X-axis.

The program generator 320 receives this information and uses a conventional APT processor program 330 to assemble a basic part program shell. The program shell consists of geometric information describing the article to be manufactured by the number and position of the plies and the general direction and configuration of the tape courses. This shell is made from the surface information stored in data file 336 and from command data previously stored as standard APT part programs from file 328. The APT processor 330 is a program providing the necessary software tools for a part programmer to assemble the part program shell from these two data sources. The part program shell essentially describes the article in the geometric terms of plies but without natural path data included.

Once the shell program is assembled from the various sources of data, it can be expanded by a course and ply generation routine 322 to include natural path data for the tape courses. The course and ply generation routine 322 may be commanded to generate a whole ply or to generate individual courses with natural paths for the control processor 344. When a command is given to generate a ply, the system automatically computes all the natural paths and end cuts for each course covering the area bounded by the ply periphery. The gaps between the courses of the ply are kept at a specified tolerance along the control lines and the direction of the tape lay can be reversed 180° between two adjacent courses to minimize machine motion and tape scrap. After the courses of one ply are generated, the surface data in memory are updated to reflect the thickness of the new ply.

The part program generator 320 provides graphics monitoring with a video monitor 334 where the generated courses of the composite tape can be visually inspected by an operator on a graphics display. With the aid of the graphics monitor 331, a part programmer through the keyboard of the monitor can make adjustments to the courses to provide more control over the gap and overlaps of the tape courses for a ply.

Figure 16A:
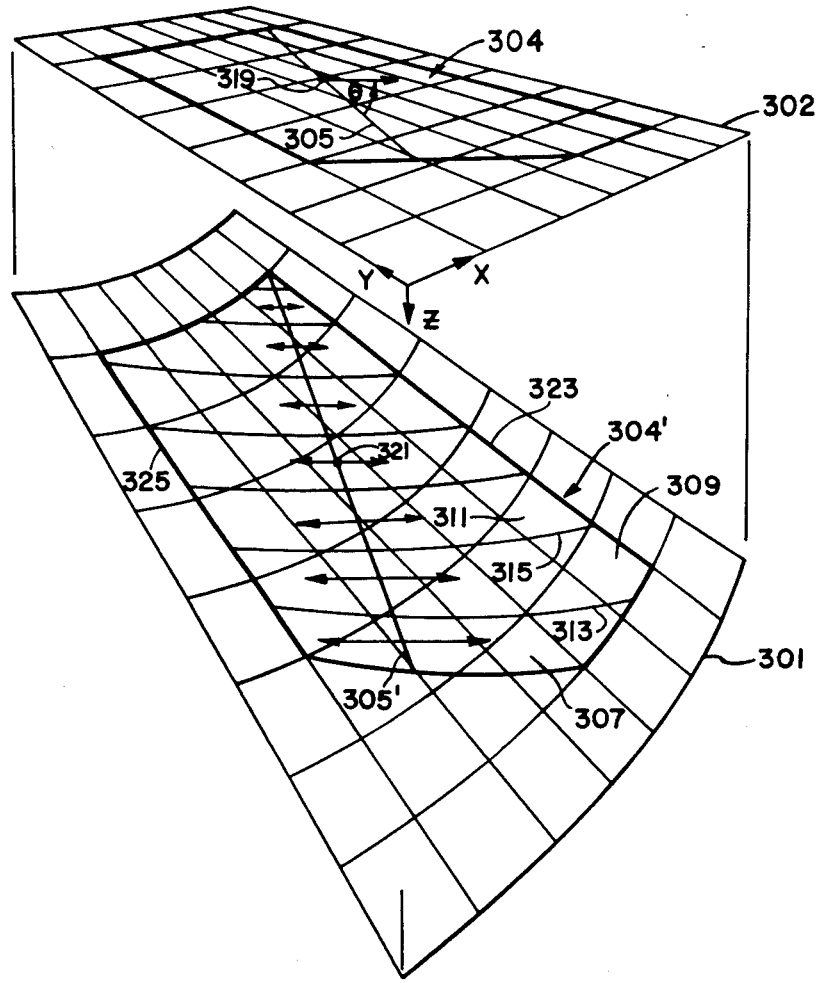
FIG. 16A is a pictorial representation of a surface and the peripheral extent of an article on a contoured surface for the tape laying machine illustrated in FIG. 1.

FIG. 16A illustrates a graphical representation of the data which is input to the part program generator 320. The initial or starting surface of the mandrel 22 is mathematically represented by surface 301 as a number of rectangular coordinate points forming a grid. The grid lines are equally spaced along the surface of the X-Y plane 302 a real distance apart, such as one inch. The grid points are stored in the sequential data file 336 such that the X, Y, and Z coordinates of each surface point are maintained for operation by the part program generation. For the preferred implementation, the maximum size of a grid is 600×160 grid points.

Projected on the surface 301 is a ply periphery 304 which defines the outermost edges of the finished article on the mandrel. The ply periphery 304 is projected from the X, Y plane such that the same termination criteria for the courses may be used for all the different plies by projection. The surface 301 described by the grid points is extended at least some distance beyond the edges of the intended article because during natural tape path calculation some of the edge points calculated may end up outside of the edges of the part. To correctly calculate these points, the surface extension is necessary.

A control line 305 is also provided for determining an area along which the gaps between courses of tape are closely controlled. The control line 305 is further defined in the X, Y plane such that it may be projected upon each ply similar to the manner that the periphery 304 was projected. One ply of composite tape laid on the surface 301 is shown, as is the projection 304' of the ply periphery onto the Z coordinates of the surface 301. The control line projection 305' from the control line 305 is also shown.

Each course, for example 307, 309, 311, follows a natural path on the surface or contour 301 without putting unequal tension on the edges of the course and has its ends cut to fit within the periphery. Each course is laid on the surface in an opposite direction to the one adjacent to it to minimize tape waste and machine motion. The gaps between adjacent courses, for example, 313 between courses 307 and 309, and 315 between courses 309 and 311 are controlled to a very close tolerance along control line projection 305' but are not as closely regulated away from that line. General angles that the tape courses make with respect to the X-axis are 0°, 45°, and 90°. Further, particularly for the 45° application, plies may alternate from +45° to −45° so that the courses of adjacent plies will crisscross for strength in the building of an article. However, it is readily evident that any angle with respect to a reference may be used.

The computation of the natural path is basically as follows. First, a load point 321 is calculated on the surface where the natural path on the surface 301 will cross the projected control line 305'. The course path is now split into two paths, with each path starting at point 321 and being computed in opposite directions at a control angle until they intercept the opposite ply periphery segments 323, 325. The computed path points are then merged into one path and rearranged to have a path direction opposite to that of the an adjacent course. The initial course angle is measured with respect to the X-axis at the point where the center of the course crosses the control line.

There are several distinct advantages to this method of calculating a natural tape path on a complex contoured surface. Initially the gap distance 313, 315 between tape courses on the control line can be readily regulated because the load points are picked along it. Further, the natural path is generated in both directions from the control line such that, although the gaps are not tightly controlled, the tension in the edges of the tape are minimized. This prevents wrinkling, overlays, and other detrimental positionings of the tape. Moreover, the angular orientation tape courses with respect to the control line allow a efficient use of the tape while minimizing the complexity of the end cuts. It is desirable to lay the composite tape at an angle transverse to the control line such that strength is maintained in the composite article but efficient use of the tape product is also provided.

Figure 17:
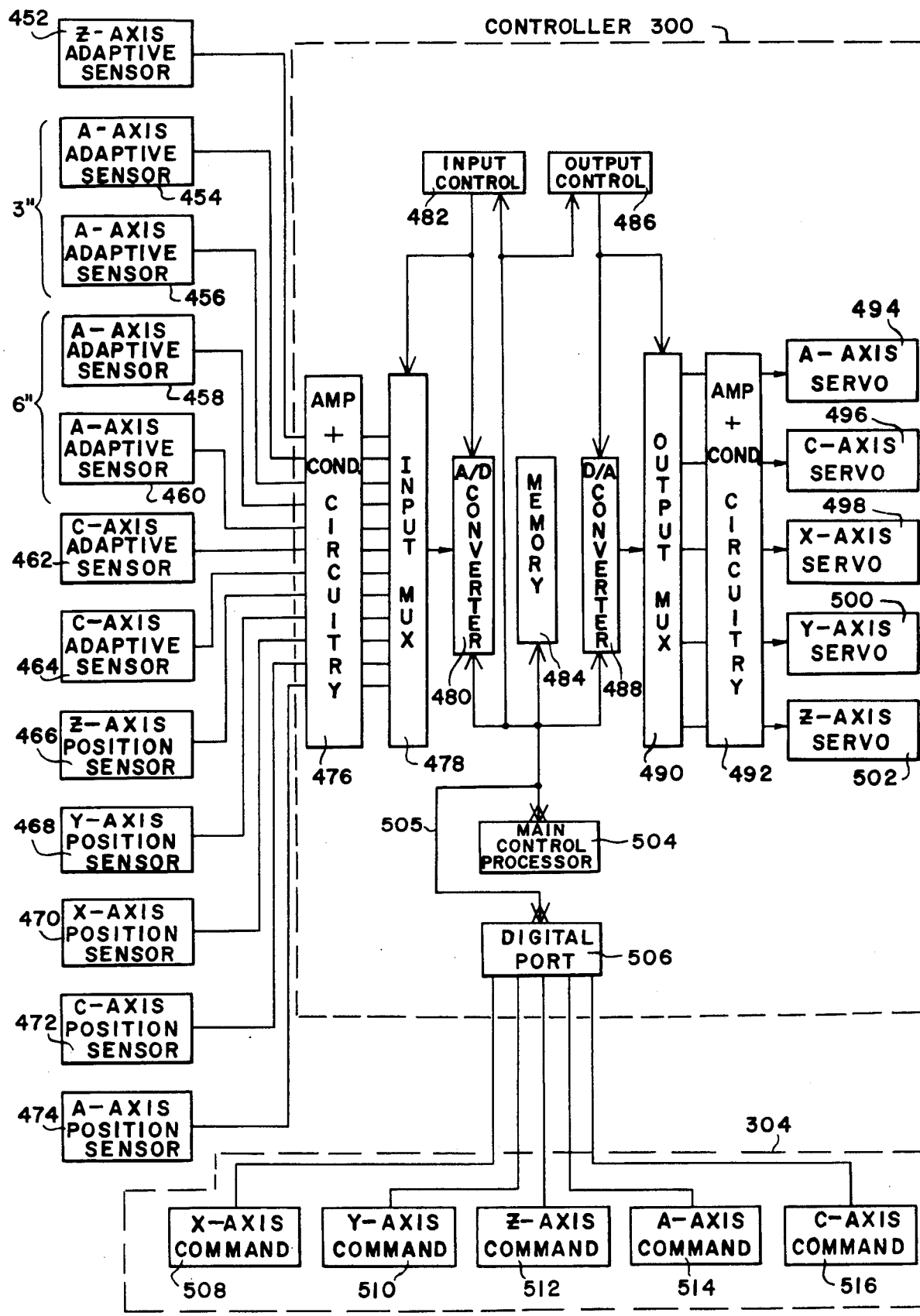
FIG. 17 is a detailed hardware block diagram of the CNC controller illustrated in FIG. 16.

A hardware block diagram of the controller 300 and its inputs and outputs will now be more fully described with reference to FIG. 17 to provide a better understanding of the implementation of the adaptive control. It is seen that the controller 300 comprises a group of input circuitry under the control of an input control 482 and a group of output circuitry under control of an output control 486. Controller 300, as described hereinbefore, is preferably a CNC device including a main processor 504 which communicates via a data bus, address bus, and control bus, collectively 505, to a digital memory 484, the input control 482, and output control 486. The output control 486 develops control signals for a group of servos 494, 496, 498, 500, and 502 which actually power the servo motors for the A, C, X, Y, and Z-axes, respectively, to cause coordinated movement along the multiple axes by the tape laying head 20. The input control 482 is used to control a digital port 506 through which the processor 504 communicates with the control processor 304. A machine instruction is read from the digital port 506 into the memory 484 for processing by the processor 504. The machine instruction from the processor includes the data necessary for generating the X, Y, Z, A and C-axis position commands (508-516).

Further the input control 482 controls an input multiplexer 478 and an analog to digital converter 480. During an input scan routine the multiplexer inputs are sequentially scanned and the values obtained converted to digital numbers which are stored in the memory 484. The input ports to the input multiplexer 478 are connected to individual amplifier and conditioning circuits 476. The inputs to the amplifier and conditioning circuitry 476 are from the adaptive sensors 452, 454, 456, 458, 460, 462, and 464 and position feedback sensors 466, 468, 470, 472, and 474 of the tape laying machine. The Z-axis adaptive photodetector sensor is represented at 452, while the A-axis adaptive photodetector sensors for the 3 inch wide tape are shown at 454 and 456, respectively. The 6 inch adaptive photodetector sensors for the A-axis of the machine are labelled 458 and 460, respectively. The two C-axis adaptive photodetector sensors are 462 and 464, respectively. The feedback position sensors for each of the five axes Z, Y, X, C, and A are shown as blocks 466-474, respectively.

The output controller 486 controls a digital to analog converter 488 and an output multiplexer 490. The control processor 504 receives the digital position commands from port 506 and the feedback signals from A/D converter 480, and transforms them through a plurality of control law loops into separate digital control signals which command the motion of the tape laying head 20. The digital control signals are output by means of the output control 486 to the D/A converter 488 where they are converted to analog control signals. The output multiplexer 490 receives the analog control signals for the X, Y, Z, A and C-axes from the digital to analog converter 488 and applies them to the separate servos 494-502 controlling the servomotor of each axis.

Figure 18:
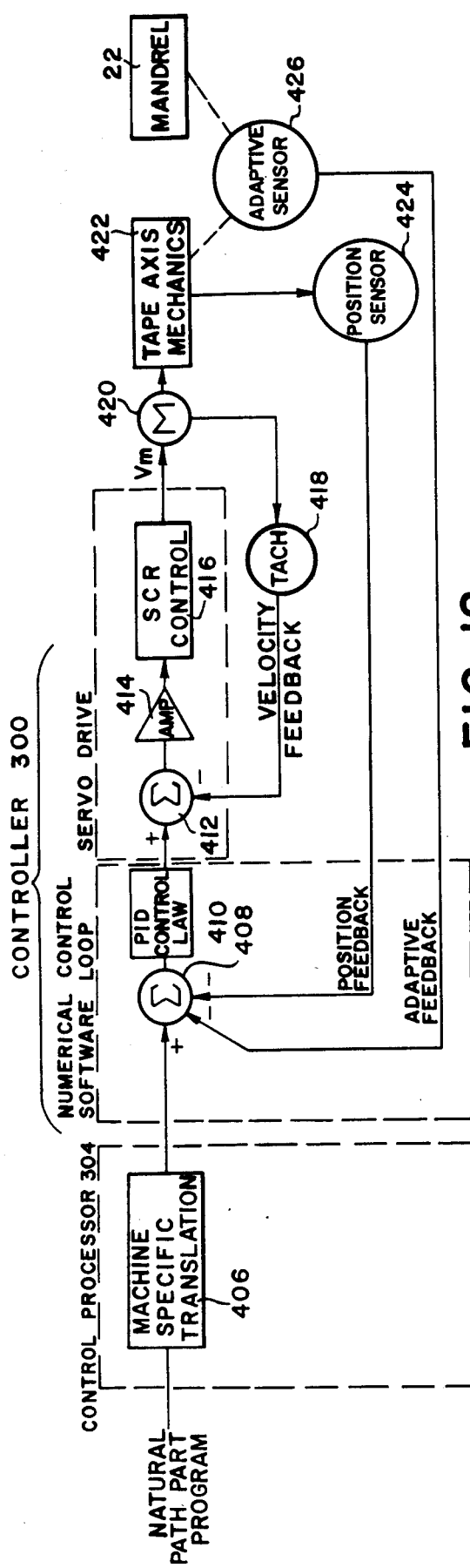
FIG. 18 is a functional block diagram of the adaptive and closed loop control of one axis of the tape laying machine illustrated in FIG. 1.

More fully illustrated in FIG. 18 is a block diagram of a representative position control for one axis of the tape laying machine having adaptive feedback. As such it is representative of each of the axes A, C, and Z which in the preferred embodiment are controlled adaptively as a superposition upon the part program natural path control. However, it is evident that different types of adaptive controllers could be used to regulate one or more axes. The figure will be described with respect to the Z-axis but it should be understood that the description will apply equivalently to the other adaptive axes. The X and Y-axes are controlled by similar position controls without adaptive feedback.

The control of each tape axis movement is performed by a servo drive which generates a voltage or control signal Vm to a motor 420 which is connected to the tape axis mechanics 422 for the particular axis. The servo drive controls the motor 420 to position the tape axis mechanics to a particular position or coordinate with respect to a zero reference for the axis. A feedback position sensor 424 measures the actual or absolute position of the tape axis mechanics with respect to the reference for that axis. The adaptive position sensor 426 for that axis measures the actual surface of the mandrel 22 and relates that surface to where the controller believes the surface to be because of the mathematical description used to derive the part program.

The servo drive is driven by a computerized numerical control (CNC) software loop forming a control law including a summing junction 408 and a control law function generator 410. The control law function can be any combination of proportional, integral, and derivative gains. The summing junction 408 of the numerical control software loop produces a velocity error signal based on the difference between a commanded or desired position and the actual position. The actual position is determined for the axis of the tape laying machine in part by the position feedback signal from the position sensor 424. With the position feedback signal, the adaptive feedback signal from an adaptive sensor 426 is combined in the summing junction 408. The adaptive sensor 426 generates the adaptive feedback signal to form in addition with the position feedback signal an actual position signal that relates the internal coordinate system of the tape axis mechanics 422 to the actual surface of the mandrel 22.

Generally, the difference between the commanded position signal and the position feedback signal generate substantially the entire velocity error signal. However, for those positions on the surface of mandrel 22 which do not conform to the mathematical description from which the commanded position signal was generated, a slight alteration from the adaptive feedback signal is used to change the position feedback signal from the internal coordinate system to that of the actual surface of the mandrel 22.

The commanded or desired position signal is generated at specific times from the control processor 304. The control processor 304 takes a natural path part program and does a machine specific translation as illustrated by functional block 406 to determine the movements or commanded positions for each axis of the tape laying head 20. The machine specific motion command is then interpolated into an axis position command in controller 300 before being input to the software control loop at summing junction 408.

The servo drive of the controller 300 is of a type conventionally known in the art. The servo drive comprises a standard velocity servo including a summing junction 412, a proportional gain amplifier 414, an SCR control 416, and tachometer 418. The feedback for the servo drive, rather than being a position signal, is a velocity signal from the tachometer 418 measuring the speed of motor 420. The summation in junction 412 of the feedback and output of function generator 410 causes a velocity error signal from the summing junction 412 which is proportional to the velocity of the motor. Thus, the servo drive moves from point to point at a velocity determined by the commanded velocity input from function generator 410 signal which is amplified by amplifier 414 and input to the SCR control 416. The commanded variations in motor speed are conventionally controlled by the SCR control 416 which varies the amount of phase of a AC waveform which is input to the motor 420 every cycle. Such SCR controls are standardly known to include one or more phases depending upon the windings and desired configuration for motor 420.

Figure 20:
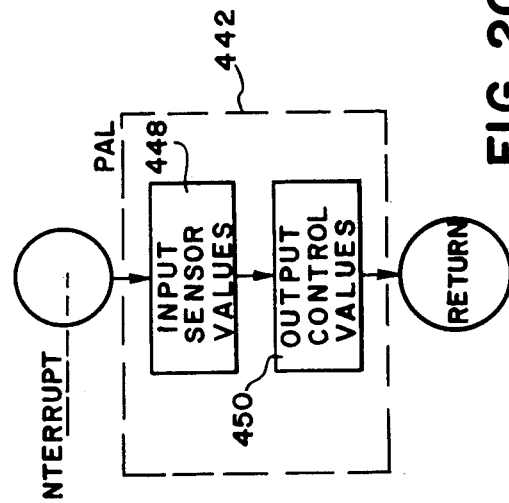
FIG. 20 is a representative flow chart of the machine language routines used for input and output of data to the processor of the controller illustrated in FIG. 17.
Figure 19:
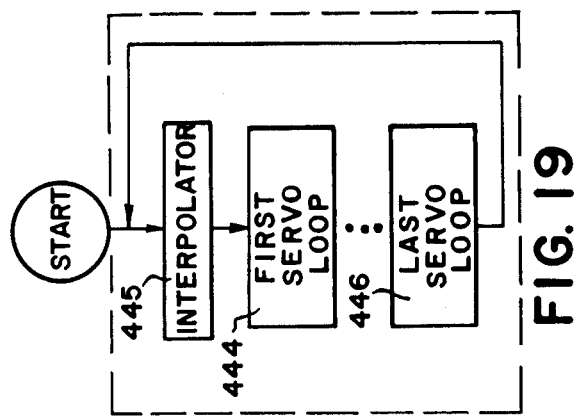
FIG. 19 is a representative flow chart of the executive routine used to regulate the processor of the controller illustrated in FIG. 17.

The main control processor 504 is software controlled by a program shown generally in FIGS. 19 and 20. The input and output controls 482 and 486 are serviced on an interrupt basis by the routine of FIG. 20. The machine language routine first operates an input scanner subroutine 448 to read and store the input values of the sensors 452-474. The routine will then call an output scanner subroutine 450 to output the digital control signals from the memory 484 to servos 494-502. The machine language routine after it finishes the input and output scanning, returns control to the place in the main or executive routine of FIG. 19 from which it was called. Normally, the program is called or executed on a real time basis every 10 millisecs such that the control signals can be updated that quickly and the control moves smoothly from point to point. All the feedback position sensors are scanned every interrupt or 10 millisecs while the adaptive sensors are scanned every 40 millisecs so that they can be combined with the position feedback signals.

The executive routine which operates in background and acts as a main control receives position instructions from the processor controller 304 and interpolates them by function block 445 into the various commanded positions for the tape laying head 20. The interpolator 445 determines how fast to change each commanded position for each axis such that a linear path is taken from one commanded point to another considering the topography between them. Thus, the interpolator 445 will break up a command to move from position A to position B into a number of position commands for each axis such that the movement of the tape head 20 is coordinated between all axes. The commanded positions are input periodically into separate software servo loops 444, ... 446 for each axis where the individual control laws act on them. The control laws operate on the position commands and feedback signals to form the control signals which are then stored in memory 484 and later output to the velocity servos 494-502.

From the structure in FIGS. 17-20 it is evident that the machine is controlled by a linear interpolative feedback control to produce a track path based on the natural path algorithm. All the axes X, Y, Z, A, and C are integrated onto that tracking path by use of the interpolator 445 illustrated in FIG. 19. The interpolator causes the tracking path to be traveled in a linear manner between points determined by the instruction commands from the machine specific translation in block 406. This operation causes a coordination or dependence between the axes for the accurately following the tracking path. The adaptive feedback signals from the adaptive sensors, represented at 426, are added after this interpolation.

Because the adaptive feedback signals are added after the interpolative effects of the natural path control, the signals do not specifically affect the tracking path as there is no adaptive feedback on the X, Y-axes and the adaptive signals are not interpolated themselves. The adaptive feedback sensors are only added independently to those axes which affect the tape laying conditions. Thus, the adaptive sensor for the Z-axis independently adjusts the general tape laying head position on the roller segments 60 while the A-axis sensors independently adjust the tilt or A-axis position of the head 20. Further, the C-axis adaptive sensors independently control the rotation of the tape laying head 20 about the C-axis such that the roller segments 60 are positioned squarely in contact with the composite tape 72.

Because each adaptive feedback axis is independent of any of the others and all those axes have a path track which has been previously interpolated, the adaptive sensor signals do not affect the tracking path to any degree. The adaptive sensor signals provide slight alterations in the A, C, and Z-axis movements to bring the tape laying head 20 back to the neutral position or optimum tape laying conditions. The adaptive feedback combines with the position feedback to translate the actual surface to the position where the tape laying machine believes the surface to be. With such control the tape laying machine can reproduce parts with facility even on lay surfaces which are substantially different from that used to generate the natural path part programs, and produce substantially identical parts therefrom with high production rates and precision tolerances.

While a preferred embodiment of the invention has been illustrated, it will be obvious to those skilled in the art that various modifications and changes may be made thereto without departing from the spirit and scope of the invention as defined in the appended claims.

What is claimed is:

1. A multi-axis tape laying machine for depositing composite tape on a lay surface in courses to produce the plies of a laminated structure of compound contour, said tape laying machine comprising:
   a tape laying head moveable along a plurality of axes in accordance with control signals from a control processor means;
   a mandrel having an actual contoured lay surface for defining the shape of at least one contoured ply of said laminated structure;
   said control processor means generating said control signals in accordance with the natural tape path of each course of a ply along a representation of said actual surface; and
   adaptive control means for independently modifying said control signals to at least one individual axis in order to compensate for differences between said actual surface and said representation of the actual surface.

2. A multi-axis tape laying machine as defined in claim 1 wherein said tape laying head is moveable along a vertical axis in accordance with said control signals and includes:
   a plurality of press down rollers for applying a predetermined amount of pressure against said composite tape, for maintaining contact with said surface, and for maintaining a substantially constant tape length between said rollers and a reference during the deposition of the courses, said contact and constant tape length corresponding to a specific roller position with respect to a reference; and
   said adaptive control means including means for adjusting said roller position by movement of said tape head along said vertical axis to maintain said contact and constant tape length.

3. A multi-axis tape laying machine as defined in claim 2 wherein said tape laying head is rotatable about a vertical axis in accordance with said control signals and includes:
   guide means for providing a tape path over the center of said press down rollers; and
   said adaptive control means including means for adjusting said tape head position by rotation about said vertical axis to maintain said press down rollers centered on said composite tape.

4. A multi-axis tape laying machine as defined in claim 1 wherein said tape head is rotatable about a horizontal axis in accordance with said control signals and includes:
   a plurality of press down rollers in a row for applying a predetermined amount of pressure against said composite tape during the deposition of the courses; and
   said adaptive control means including means for adjusting the positions of said rollers by rotational movement of said tape head about said horizontal axis to maintain said rollers substantially parallel to the actual surface.

5. In a multi-axis tape laying machine for depositing composite tape in courses to produce the plies of a laminated structure of compound contour wherein said tape laying machine includes a tape laying head moveable about a plurality of axes in accordance with control signals from a control processor means, a mandrel having an actual contoured surface for defining the shape of at least one contoured ply of said laminated structure, and said control processor means receiving machine instructions for generating said control signals in accordance with the natural tape path of each course of a ply along a representation of said actual surface, an improvement comprising an adaptive control including:
   means for sensing the variances between said actual surface and said representative surface; and
   means for independently changing said control signals affecting individual axes to compensate for the variances between said actual surface and said representative surface without varying the natural tape path of each course as it is deposited on said actual surface.

6. An adaptive control as set forth in claim 5 wherein said means for changing include:
   means for maintaining said tape laying head squarely on the path of said composite tape as it is laid by said tape laying head.

7. An adaptive control as set forth in claim 5 wherein said means for changing include:
   means for maintaining said tape laying head substantially parallel to said actual surface as said composite tape is laid by the head.

8. An adaptive control as set forth in claim 5 wherein said means for changing include:
   means for maintaining said tape laying head in contact with said composite tape and a substantially constant length of tape between a reference and said surface as said tape is laid by said tape laying head.

9. The adaptive control as set forth in claim 5 wherein said means for changing include:
   means for maintaining said tape laying head squarely on the path of said composite tape as it is laid by said tape laying head;
   means for maintaining said tape laying head substantially parallel to the actual surface as said composite tape is laid by the head; and
   means for maintaining said tape laying head in contact and a substantially constant length of tape between a reference and said surface as said tape is laid by said tape laying head.

10. An adaptive control as set forth in claim 5 wherein said means for changing include:
    means for independently adjusting the position of said tape laying head along said individual axes to maintain a neutral tape laying position with respect to said actual surface.

11. An adaptive control as set forth in claim 10 wherein said means for sensing include:
    means for sensing the neutral positions along said axes of said tape laying head with respect to said actual surface.

12. An adaptive control as set forth in claim 11 wherein said position sensing means include:
    means for sensing a neutral position for the tape laying head along a vertical axis.

13. An adaptive control as set forth in claim 11 wherein said position sensing means include:

means for sensing a neutral rotational position for the tape laying head about a horizontal axis.

14. An adaptive control as set forth in claim 11 wherein said position sensing means include:
means for sensing a neutral rotational position for the tape laying head about a vertical axis.

15. An adaptive control as set forth in claim 11 wherein said position sensing means include:
means for sensing a neutral position for the tape laying head along a vertical axis;
means for sensing a neutral rotational position for the tape laying head about a horizontal axis; and
means for sensing a neutral rotational position for the tape laying head about a vertical axis.

* * * * *

UNITED STATES PATENT AND TRADEMARK OFFICE
CERTIFICATE OF CORRECTION

PATENT NO. : 4,750,965
DATED : June 14, 1988
INVENTOR(S) : Pippel et al.

It is certified that error appears in the above-identified patent and that said Letters Patent is hereby corrected as shown below:

IN THE SPECIFICATION

Column 8, line 14, change "69" to --60--.
Column 8, line 33, change "tape up" to --take-up--.
Column 9, line 26, change "2" to --20--.
Column 10, line 20, change "rollers" to --roller--.
Column 12, line 27, after "be" delete "is".
Column 13, line 21, change "a" to --an--.
Column 13, line 52, change "rollers" to --roller--.
Column 14, line 8, after "changed" insert a comma.
Column 17, line 22, delete "an" before "adjacent".
Column 17, line 37, change "a" to --an--.
Column 19, line 50, change "a" to --an--.
Column 20, line 36, after "for" delete "the".

Signed and Sealed this

Sixth Day of June, 1989

*Attest:*

DONALD J. QUIGG

*Attesting Officer*   *Commissioner of Patents and Trademarks*